United States Patent [19]

Matsuoka et al.

[11] 4,383,206

[45] May 10, 1983

[54] DOOR OPERATION CONTROL APPARATUS

[75] Inventors: Shigeru Matsuoka; Takeshi Tokunaga; Seiji Yonekura; Koji Yamauchi; Mitsuo Suzuki, all of Hitachi, Japan

[73] Assignee: Hitachi, Ltd., Tokyo, Japan

[21] Appl. No.: 281,425

[22] Filed: Jul. 8, 1981

[30] Foreign Application Priority Data

Jul. 9, 1980 [JP] Japan ................................. 55-92724

[51] Int. Cl.³ .............................................. G05D 3/08
[52] U.S. Cl. ..................................... 318/445; 364/513;
364/107; 318/466; 49/28
[58] Field of Search ........................ 318/445, 466–469,
318/475, 283, 284, 286, 266, 452; 364/107, 425,
513; 49/28

[56] References Cited

U.S. PATENT DOCUMENTS

| | | | |
|---|---|---|---|
| 4,263,536 | 4/1981 | Lee et al. | 318/468 |
| 4,300,660 | 11/1981 | Schoenmann et al. | 318/266 |
| 4,328,540 | 4/1982 | Matsuoka et al. | 364/167 |

Primary Examiner—J. V. Truhe
Assistant Examiner—A. Evans
Attorney, Agent, or Firm—Antonelli, Terry & Wands

[57] ABSTRACT

A motor for operating the door is controlled for forward and reverse rotations and stoppage by a control circuit responsive to an operation command signal, an upper-lower limit signal, an obstruction detection signal and a maximum drive time over signal, thus controlling the door stepwise for opening, stoppage, closing, stoppage and opening in that order. Upon generation of an obstruction detection signal or a maximum drive time over signal during the closing operation, the control circuit controls the motor in a manner to open the door for a certain period of time, and subsequently upon application of an operation command signal, the control circuit is set in a manner to open the door again.

4 Claims, 37 Drawing Figures

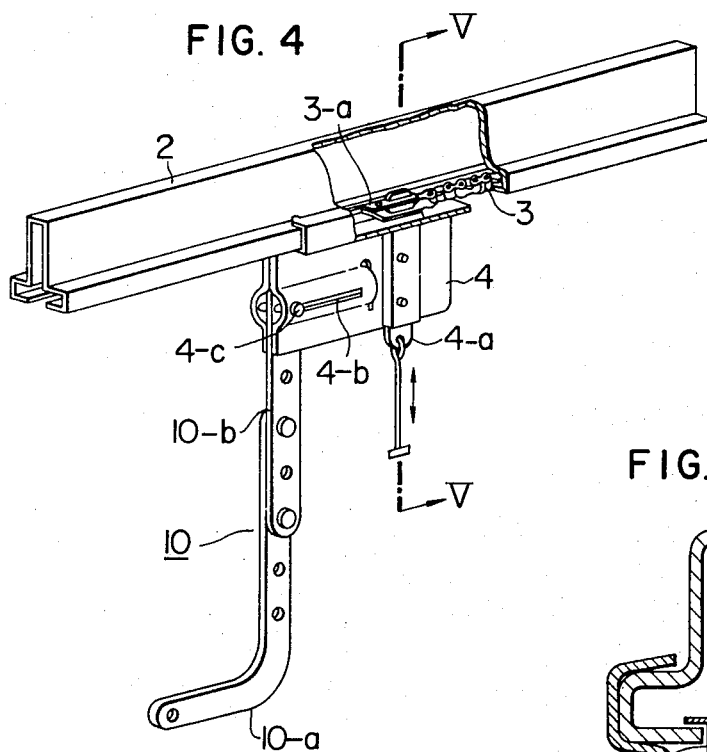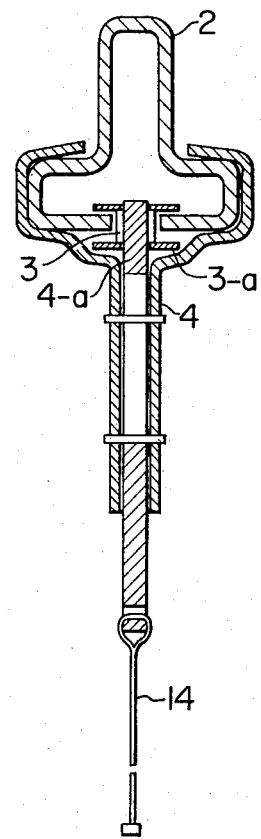

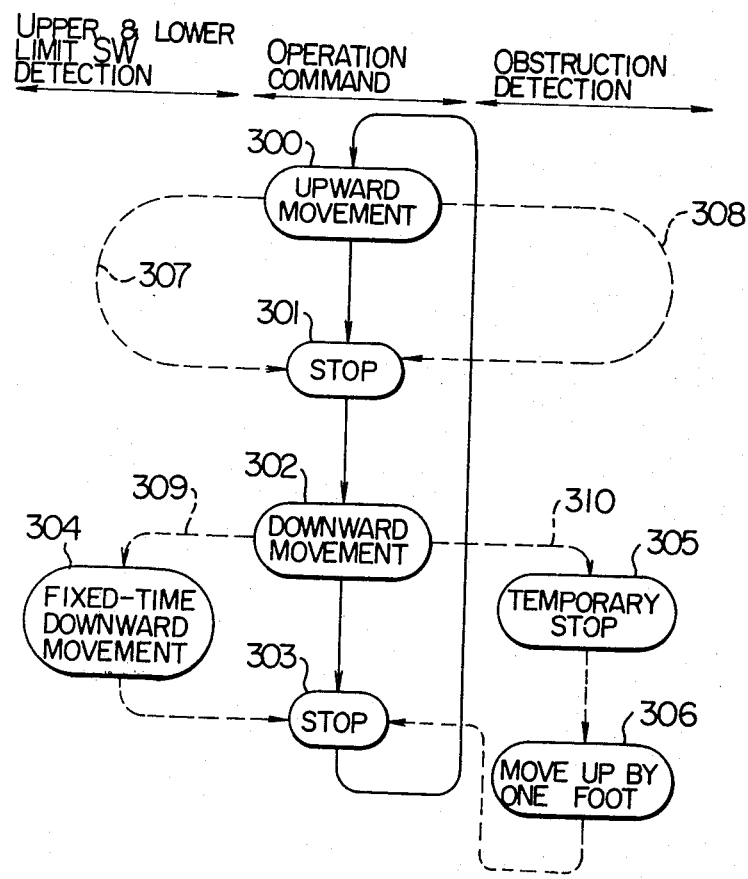
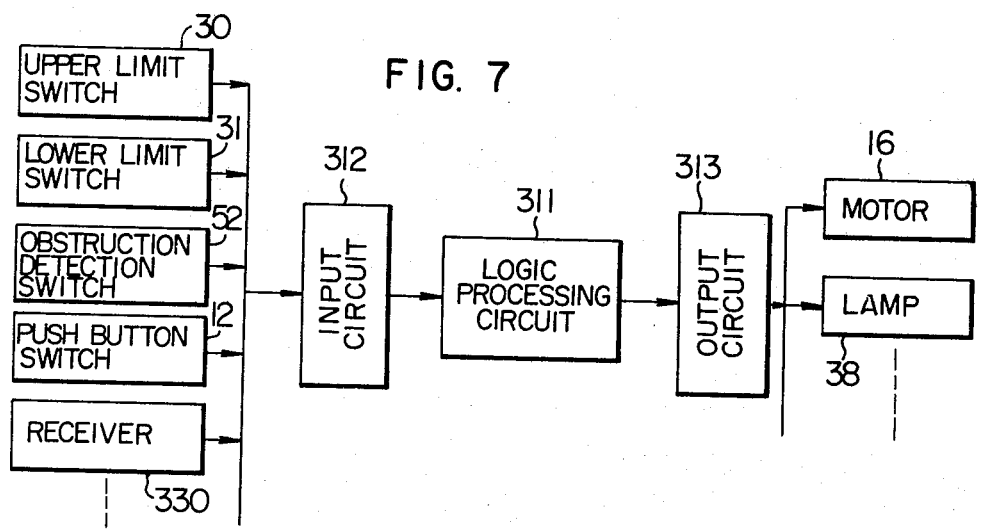

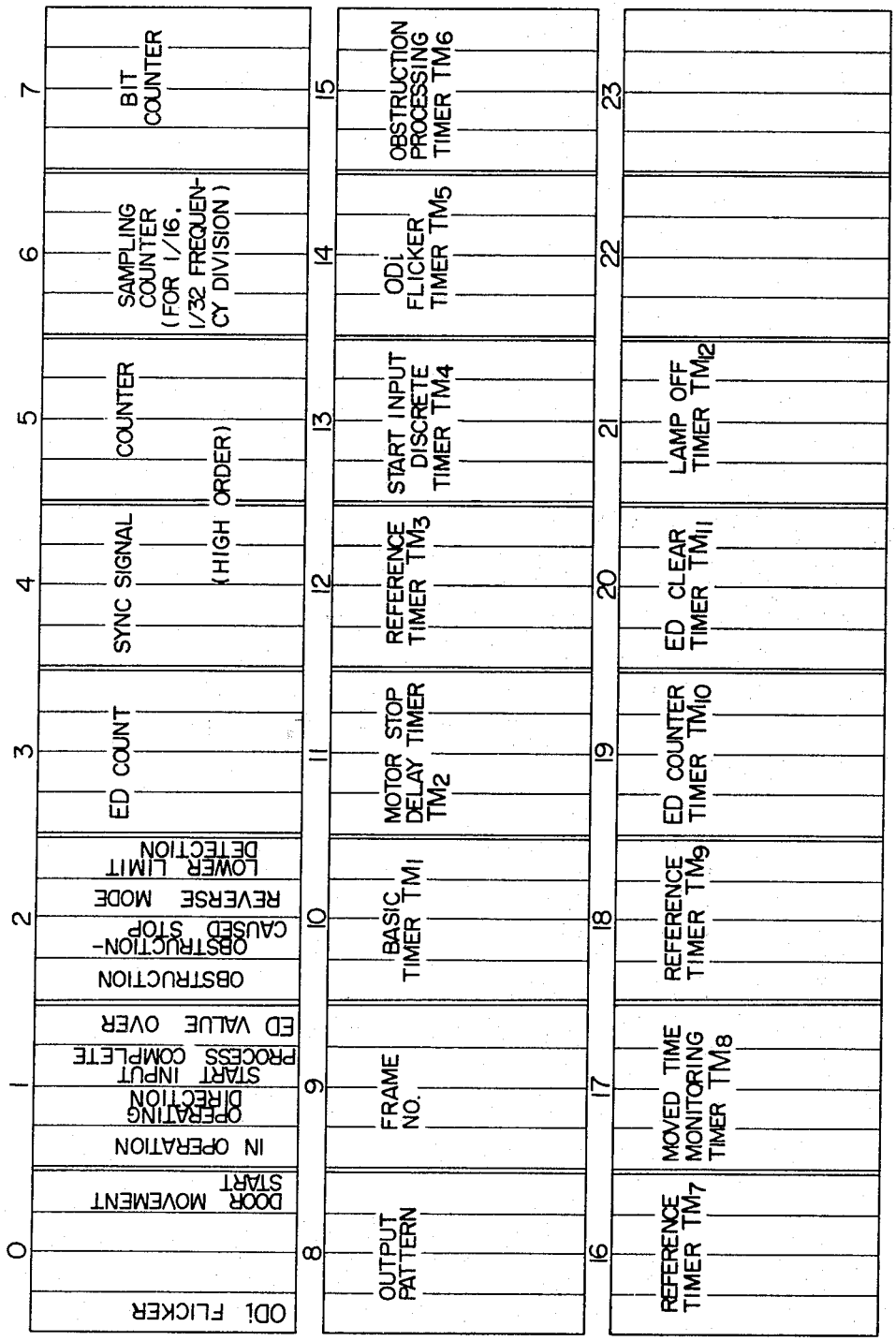

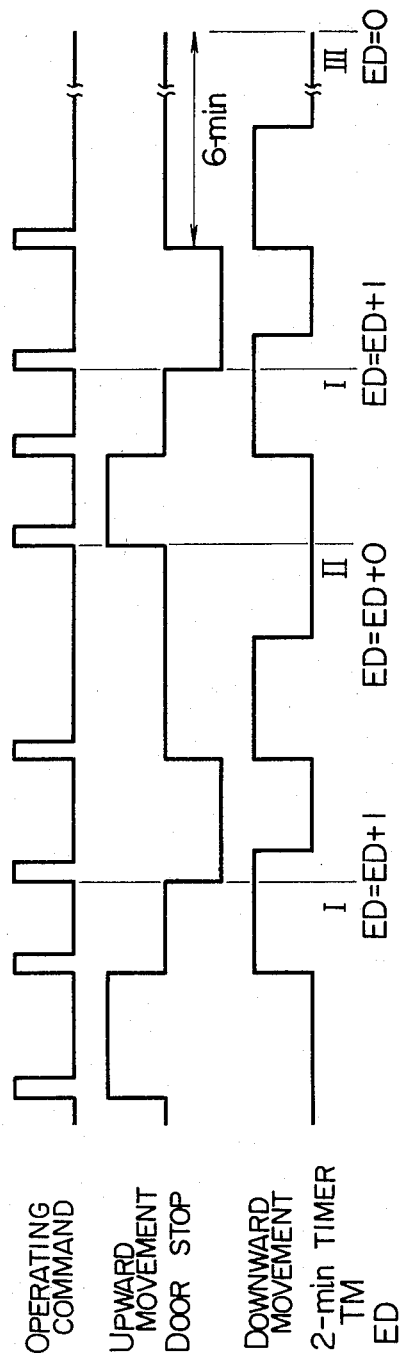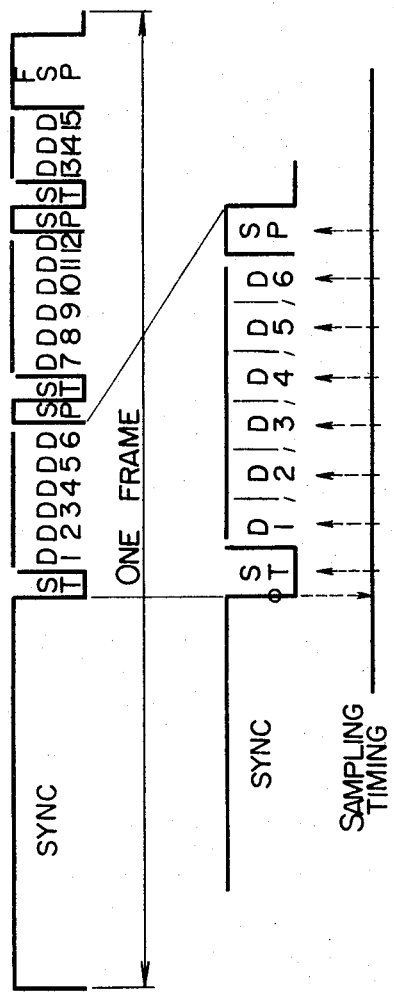

FIG. 30

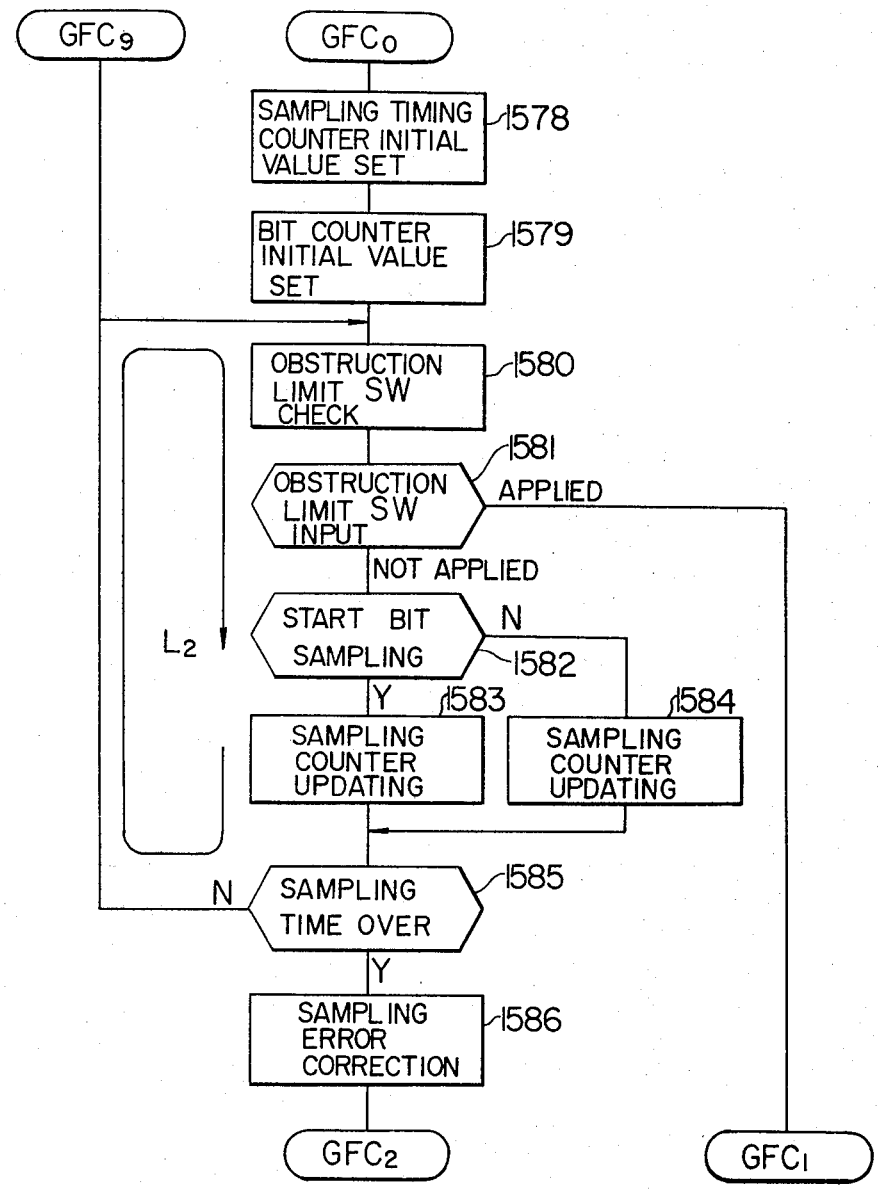

DOOR OPERATION CONTROL APPARATUS

This invention relates to a door operation control apparatus, or more in particular to a door operation control apparatus comprising control means which in response to generation of an obstruction detection signal or a maximum drive time over signal during the closing operation of the door, stops the door after opening for a predetermined length of time or by a predetermined distance.

Generally, an automatic door operation control apparatus for automatically controlling the opening and closing of a garage door in response to an operation command signal comprises door drive means for driving the operation of the door and a control device for controlling the door drive means. The door drive means is so constructed that the turning effort of a motor is converted into reciprocal motion thereby to drive the door along a rail. The control device includes an output control circuit for effecting forward rotation of the motor (for opening or moving up the door), reverse rotation thereof (for closing or moving down the door) and stoppage of the door, operation command signal generator means, condition detector means, and a signal processing circuit for controlling the output control circuit in a manner to drive the door for opening, stoppage, closing, stoppage and opening in that order in response to the operation command signal and the condition detection signal. The operation command signal generator means is provided by a push button switch or a radio controlled command signal transmitter, and the signal processing circuit steps forward the above-mentioned order of driving each time of generation of the operation command signal. When the door in opening operation reaches the upper limit position, an upper limit switch, making up one of the condition detector means, is actuated so that an upper limit detection signal making up one of the condition detector means is generated thereby to cause the signal processing circuit to effect a step forward of the operating sequence in a manner to stop the door. As a result, upon receipt of the next operation command signal, the signal processing circuit controls the output control circuit in a manner to close the door. When the door reaches the lower limit position while being closed, the lower limit switch making up one of the condition detector means is actuated so that the lower limit detection signal making up another condition detection signal is generated, thus causing the signal processing circuit to effect a step forward of the operating sequence in a manner to stop the door. Thus upon receipt of the next operation command signal, the signal processing circuit controls the output control circuit in such a way as to open the door. If the operation command signal is received when the door is moving between the upper limit position and the lower limit position, the door movement is stopped in the same manner as mentioned above. The condition detector means further includes an obstruction detector switch for detecting that an obstacle such as a person or an object is in the way between the door and the floor. Upon generation of an obstruction detection signal, the signal processing circuit controls the output control circuit in a manner to open the door. The condition detector means further includes a maximum drive time over detector circuit. This maximum drive time over detector circuit is for preventing the door drive means from being energized continuously unnecessarily over a time length longer than a reference time which is the sum of the time required for the door to move normally continuously from the upper limit position to the lower limit position and a predetermined margin time. Such an unnecessary continuous energization of the door drive means occurs in the case where the limit switch or the obstruction detector switch is faulty. In the prior art, upon production of a time over detection signal from the maximum drive time over detector circuit, the signal processing circuit controls the output control circuit in a manner to stop the door thereby to prevent the burning of the door drive means. In the event that a person is held in the way between the door and the floor, however, the mere door stoppage does not provide a satisfactory safety measure.

A patent application is made on an invention of a newly improved garage door operation control apparatus, which corresponds to a U.S. Pat. Ser. No. 123,086 filed on Feb. 20, 1980 (G.B. Pat. Appln. No. 8005766 filed on Feb. 20, 1980 and Canadian Pat. Ser. No. 346268 filed Feb. 22, 1980). According to this prior application, upon generating of an obstruction detection signal or a time over detection signal during the closing of the door, the signal processing circuit controls the output control circuit in a manner to stop the door after opening for a predetermined length of time. In this way, even if the door holds an obstacle while the obstruction detector switch is out of order, the door opens for a predetermined length of time after detection of a maximum time over, thus safely releasing the obstacle. This is also the case when the obstruction detector switch is operating normally.

Assume that in response to generation of an obstruction detection signal or a time over signal during the closing of the door, the signal processing circuit controls the output control circuit in such a manner as to stop the door after opening the same for a predetermined length of time. Upon application of an operation command signal to the signal processing circuit, the output control circuit is controlled by the signal processing circuit in a manner to close the door in the above-mentioned order of operation.

Accordingly, it is an object of the present invention to provide a door operation control apparatus further improved in safety.

Specifically, the object of the present invention is to provide a door operation control apparatus in which after stoppage following the opening of the door for a predetermined length of time in response to an obstruction detection signal or a maximum drive time over signal during the door closing operation, the application of an operation command signal to the signal processing circuit enables the door to be redriven more safely.

According to the present invention, there is provided a door operation control apparatus for controlling the drive of the door, comprising a signal processing circuit for stopping the door following the opening thereof for a predetermined length of time upon generation of an obstruction detection signal or a maximum drive time over detection signal during the door closing operation, the signal processing circuit restarts to open the door in response to an operation command signal after the above-mentioned stoppage.

The above and other objects, features and advantages will be made apparent by the detailed description taken in conjunction with the accompanying drawings, in which:

FIG. 4 is a partially cut-away view showing the condition in which a rail and a trolley are coupled to each other;

FIG. 5 is a sectional view taken in the line V—V in FIG. 4;

FIG. 6 is a flow chart showing the fundamental operation;

FIG. 7 is a basic block diagram showing a control section;

FIG. 10 shows a memory pattern for a temporary memory circuit;

FIG. 11 is a time chart for controlling the number of actuations;

FIG. 13 shows a transmission-receiving data format;

FIG. 30 shows bit-setting patterns; and

FIGS. 31 to 37 show flow charts for various operations.

Figure 1:
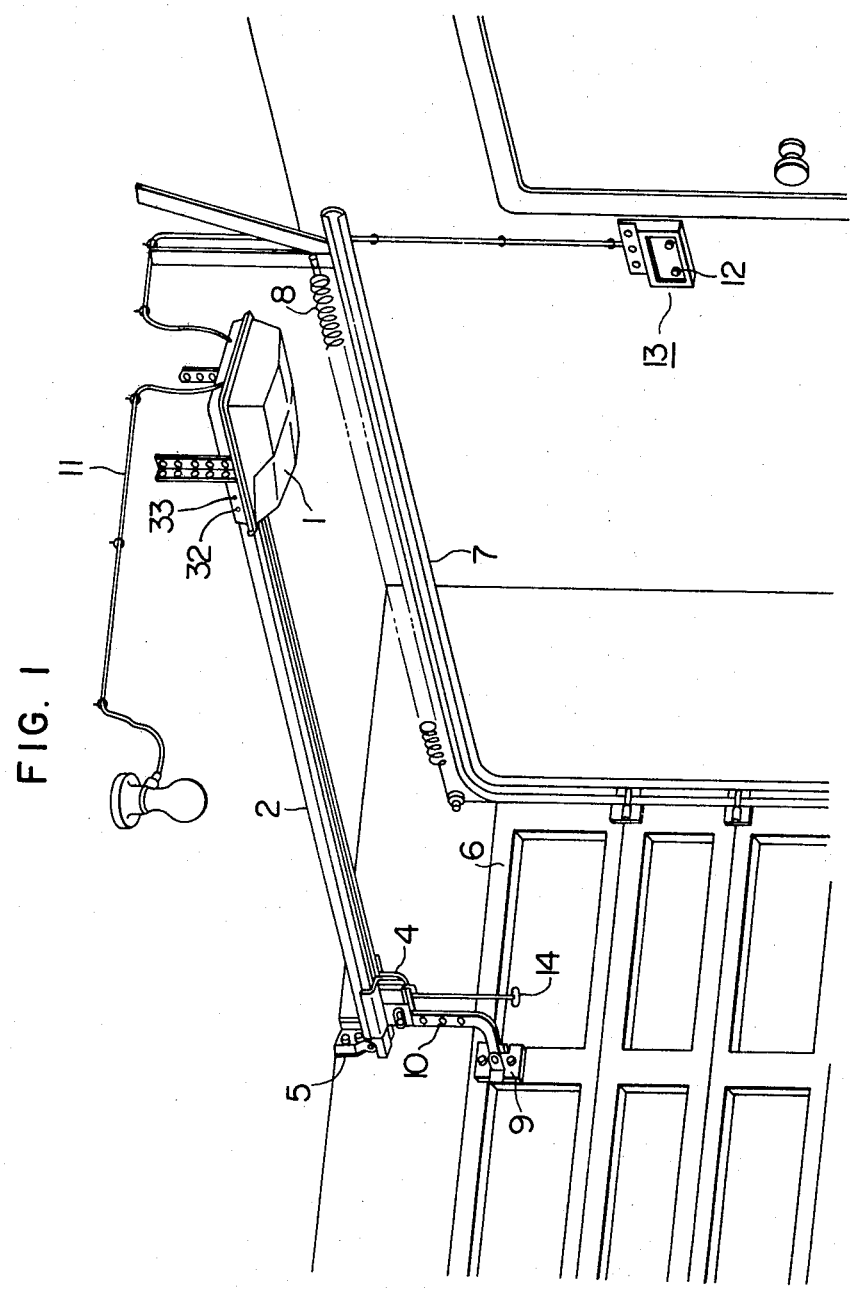
FIG. 1 is a perspective view of a door operating apparatus.

As shown in FIG. 1, a garage door operating device for which a control apparatus according to the present invention is used comprises essential parts including a body 1 housing a driving mechanism, a rail 2 coupled with the body 1, and a trolley 4 guided by the rail 2 and adapted to be horizontally moved, the trolley 4 being secured to a roller chain actuated by the driving force of the body 1. The body 1 is hung from the ceiling of the garage by a hanger, and an end of the rail 2 is secured to part of the garage by a header bracket 5. A garage door 6, on the other hand, is generally divided into several parts coupled to each other and is opened and closed along door rail 7 on both sides thereof. The weight of the garage door 6 is balanced with a door balance spring 8 and is capable of being operated manually. A door bracket 9 is secured to the garage door 6. The door bracket 9 is rotatably coupled to the trolley 4 through a door arm 10. Thus the garage door 6 is closed or opened along the door rail 7 in an interlocked relation with the roller chain 3 actuated by the driving force of the body 1 and the trolley 4 horizontally moved along the rail 2 by actuation of the roller chain 3. Power is supplied to the body 1 through a power cable 11.

A command for operating the body 1 is issued to the body 1 by depressing a push button switch 12 mounted on the wall of the garage or from a control 13 housing a receiver for receiving a signal in the form of electric wave or the like. Should the garage door operating device be rendered inoperative by a power failure or a like accident, a releasing string 14 decouples the roller chain 3 and the trolley 4, thus making the garage door 6 ready for manual operation.

Figure 2:
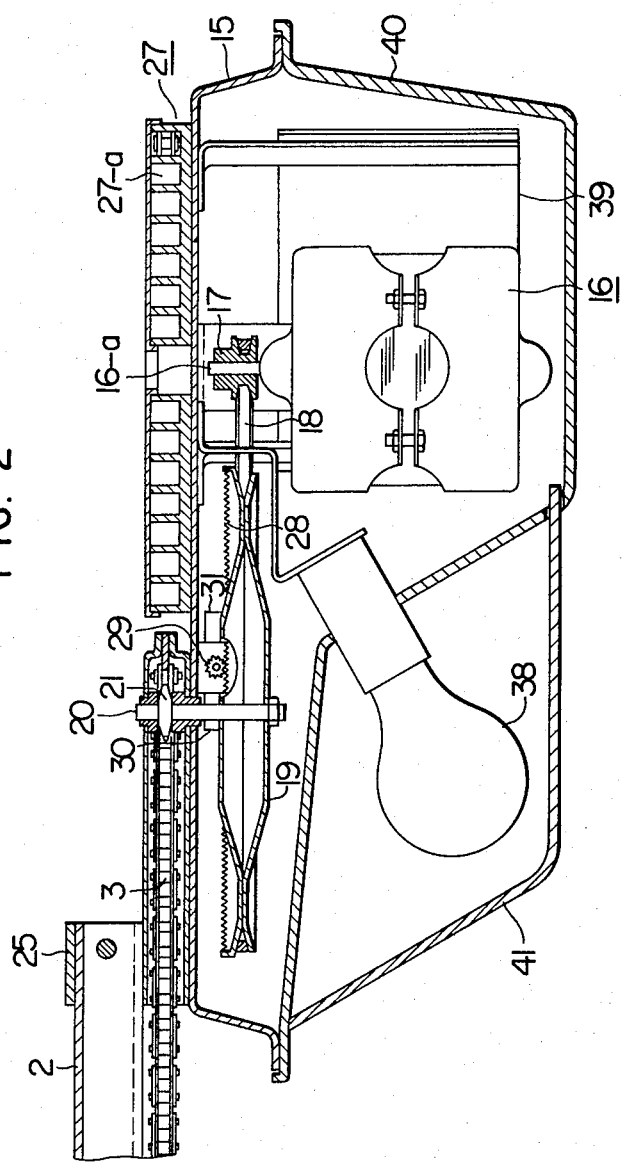
FIG. 2 is a longitudinal sectional view of the body of the door operating device.
Figure 3:
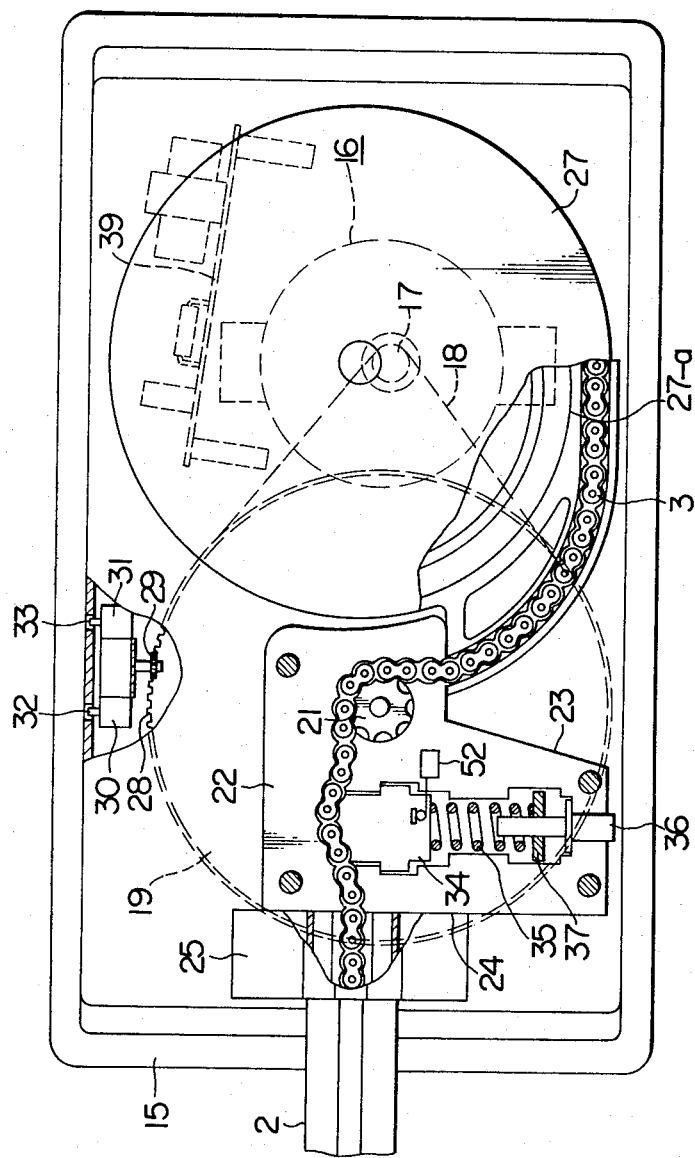
FIG. 3 is a partially cut-away plan view of the door operating device.

The construction of the body 1 of the garage door operating device will be explained with reference to FIGS. 2 and 3. FIG. 2 is a longitudinal sectional view and FIG. 3 a partially cut-away top plan view of the body 1. The turning effort of a motor 16 secured to the lower side of the body frame 15 is transmitted to a motor pulley 17 secured to a motor shaft 16-a, a V-belt 18 and a large pulley 19. Further, the turning effort of the large pulley 19 is transmitted to a sprocket 21 through a sprocket shaft 20.

The sprocket 21 is engaged with the roller chain 3. The rollers of the roller chain 3 are guided by a chain guide (A) 22, a chain guide (B) 23 and a chain guide (C) 24 from both sides thereof within the body 15. The rail 2 is secured to the frame 15 by a rail securing metal 25 without any difference in level or a gap with a groove formed by the chain guide (A) 22 and the chain guide (C) 24. The rollers of the roller chain 3 are guided on both sides thereof by the rail 2.

The roller chain 3 taken up by the sprocket 21 is contained in a chain containing groove 27-a of a chain containing case 27 secured without any difference in level or a gap with the groove formed by the chain guide (A) 22 and the chain guide (B) 23.

In this construction, the rotation of the motor 16 rotates the sprocket 21, so that the roller chain 3 is reciprocated along the rail 2.

Next, a limit mechanism for limiting the horizontal movement of the trolley 4, i.e., the upper and lower limits of the operation of the garage door 6 explained with reference to FIG. 1 will be described. The amount of movement of the roller chain 3 is converted into the amount of movement of a pulley rack 28 provided on the outer periphery of the large pulley 19 rotated at the same rotational speed as the sprocket 21. The amount of movement of the pulley rack 28 is transmitted to an upper limit switch 30 and a lower limit switch 31 through a pinion 29 in mesh with the pulley rack 28.

The upper limit switch 30 and the lower limit switch 31 have an upper limit adjusting knob 32 and a lower limit adjusting knob 33 respectively whereby the upper limit point and the lower limit point are freely adjustable from outside of the body.

In the case where the garage door encounters an obstruction during the downward motion thereof, it must be immediately detected and the door operation is required to be reversed, i.e., it must be moved upward for safety's sake. If the garage door strikes an obstruction during the upward motion thereof, on the other hand, it must be detected and the door must be stopped immediately for safety's sake. The above-mentioned obstruction detecting mechanism will be described below.

Part of the chain guide groove formed by the chain guide (A) 22, the chain guide (B) 23 and the chain guide (C) 24 is curved. An obstruction detecting device 34 is provided which is driven by the compressive force applied to the roller chain by the downward door motion or the tensile force applied to the roller chain 3 by the upward door motion. The compressive force of the obstruction detecting spring 35 for limiting the operation of the obstruction detecting device 34 is capable of being freely changed by moving the spring holding plate 37 by turning the obstruction-exerted force adjusting screw 36. Also, by the operation of the obstruction detecting switch 52 which is turned on and off in response to the movement of the obstruction detecting device 34, such an obstruction as mentioned above is detected, so that the door is reversed into upward motion from downward motion, whereas it is stopped if it is in upward motion.

A lamp 38 is for illuminating the inside of the garage, which lamp 38 is adapted to be turned on or off in response to the movement of the garage door. Further, a controller 39 for controlling the motor 16 and the lamp 38 is secured within the frame 15. A body cover 40 and a lamp cover 41 cover the motor 16, the large pulley 19 and the lamp 38. The lamp cover 41 is translucent and allows the light of the lamp 38 to pass therethrough, thus brightly illuminating the inside of the garage. The foregoing is the description of the construction of the body of the garage door operating device. Next, the rail and the trolley will be explained below with reference to FIGS. 4 and 5.

The rail 2 is formed of a thin iron plate or a plastic plate and is used to slidably guide the trolley 4 along the outer periphery thereof. The rail 2 holds the rollers of the roller chain 3 from both sides thereof thereby to reciprocate the roller chain 3 in a straight line. The trolley 4 and the roller chain 3 are coupled to each other in such a way that a connecting metal 4-a is inserted into a slot formed in the roller chain attachment 3-a secured to the end of the roller chain 3 and guided in the same manner as the roller chain 3. The connecting metal 4-a is slidable within the trolley 4 and is normally held up by the force of a spring or the like, thus coupling the trolley 4 with the roller chain 3. In the event of a power failure or other accident when the door is required to be operated by human power by separating the garage door operating device from the door, the connecting metal 4-a is pulled down and separated from the roller chain attachment 3-a. The door arm 10 for transmitting the operation of the trolley 4 is comprised of an L-shaped door arm portion 10-a and a straight door arm portion 10-b which are coupled with the length thereof determined freely depending on the positional relation between the door and the rail. An end of the door arm 10 is connected to the trolley 4, and the other end thereof is connected to the door 6 through the door bracket 9 shown in FIG. 1. The door arm 10 and the trolley 4 are connected with each other in such a manner that a pin 4-c is inserted into the slot 4-b of the trolley 4. The pin 4-c is normally kept pressed as shown in FIG. 4. This is for the purpose of absorbing the shock which will occur if the door collides with an obstruction while moving down and also provides for a soft landing of the door during normal downward operation as the door reaches the floor.

Further, some action must be taken to prevent the reversing of the door downward movement by erroneous obstruction detection in the presence of a small item such as a water hose or the raising of the floor surface by snow, ice or the like. Specifically, up to the height of two inches from the floor surface, it is necessary that the door movement be not reversed but stopped by detection of an obstruction. In this case, the difference of the amount of movement between the trolley 4 and the door 6 is compensated by a control arrangement which will be described more fully hereinafter.

An embodiment of the present invention will be described below with reference to FIGS. 6 to 37.

The diagram of FIG. 6 shows a flow chart illustrating the sequence of the fundamental operations of the garage door. In FIG. 6, after power is thrown in, the garage door 6 is in the stationary state 303. In response to each operation command, the garage door 6 repeats the processes including the upward movement 300, stationary state 301, downward movement 302 and stationary state 303 in that order. Apart from these operating commands, the door 6 promptly transfers to the stationary state 301 through the state 307 when an input is applied from the upper limit switch 30 in response to the garage door 6 in the upward movement mode 300. When an input signal is applied from the lower limit switch 31 in response to the garage door 6 in downward movement 302, by contrast, the door 6 transfers to the fixed-time downward movement 304 through the state 309, and after the fixed time, it enters the stationary state 303. The reason for which the door moves down for the fixed time length will be explained later in detail.

Now, explanation will be made about the action to be taken when the movement of the garage door 6 is stopped to secure the safety thereof. In the case where an obstruction detection signal is applied while the garage door 6 is moving up, it promptly enters the stationary state 301 through the state 308. In the presence of an obstruction detection input during the downward movement of the garage door 6, on the other hand, the door transfers to the temporary stationary state 305 through the state 310, and after a fixed time length, transfers to the state 306 one foot higher. This one-foot rise is time controlled, so that after a predetermined length of time, the door transfers to the stationary state 301. Assuming that an input signal is applied from the upper limit switch 30 while the door is moving upward by one foot as mentioned above, however, the input from the upper limit switch 30 is given priority, so that the door 6 immediately transfers to the stationary state 301.

The reason for the downward movement for the fixed time length described above will be explained below. Generally, in winter season, the floor level under the door is liable to change due to the freezing or snowfall. If the floor level changes and rises from the initially-set level for the reasons mentioned above, the door moving down will always actuate the obstruction detection switch 52 and transfer to the state 310, thus making it impossible to close the door. For this reason, according to this embodiment, the lower limit switch 31 is actuated before the door 6 is closed up completely, so that the door is closed up after further downward movement for a predetermined length of time. In the presence of an input from the lower limit switch 31, a stop signal is produced when the obstruction detection input is received prior to expiration of the fixed length of time. By doing so, proper door operation is not affected by any change in the floor level under the door.

More specifically, adjustment is made to actuate the lower limit switch 31 at the height of 2 inches from the floor level, so that the door 6 is completely closed up after the downward movement 304 for the fixed length of time. If the obstruction detection switch 52 is turned on during the fixed-time downward movement 304, action against the obstruction is given priority, so that the door 6 rapidly transfers to the stationary state 303. In this way, the pressing force against an obstruction present within two inches from the floor level is reduced.

The processes for controlling the garage door according to the present invention as mentioned above will be explained more in detail later with reference to the flow charts of FIGS. 14 to 37.

A basic block diagram of the control section is shown in FIG. 7. The control section basically comprises an input circuit 312, a logic processing circuit 311, and an output circuit 313. The input circuit 312 is an interface circuit having what is generally called a signal level conversion function, which circuit is impressed with signals representing the conditions of the garage door 6, from the upper limit switch 30, the lower limit switch 31, the obstruction detection switch 52 and a signal for operating the garage door 6 from the push button switch 12 or the receiver 330 for radio control. These signals are processed in optimum manner according to the processing steps stored in advance, and the resulting output is produced. This output signal is amplified by the output circuit 313, thereby subjecting the motor 16 to forward-reverse control and the in-garage illumination lamp 38 to on-off control.

Figure 8:
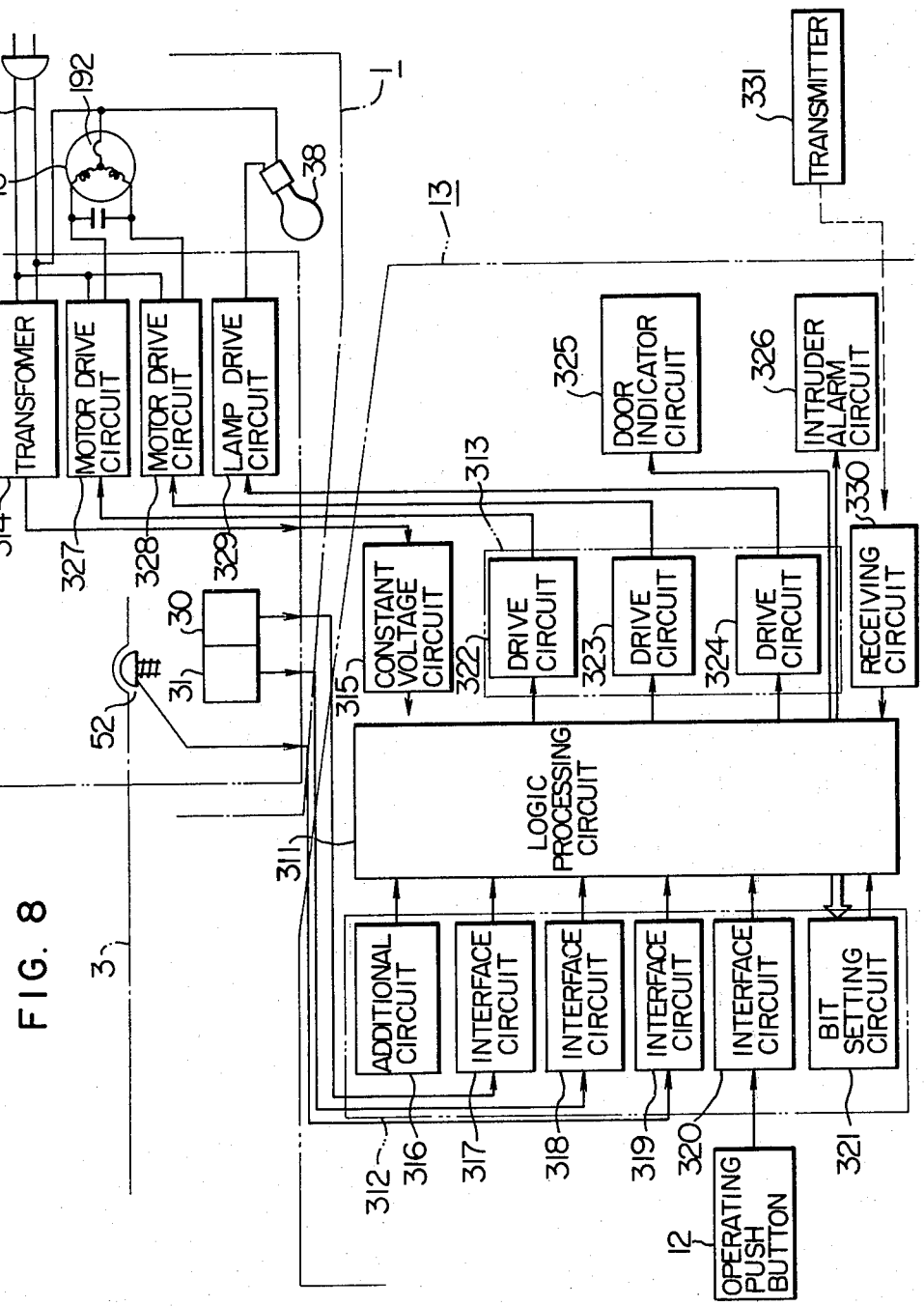
FIG. 8 is a block diagram showing the same control section in detail.

An embodiment representing the basic block diagram of FIG. 7 is shown in FIG. 8.

According to the present embodiment, the control device 13 containing the receiver also contains all the signal processing parts primarily including the logic processing circuit 311. The body 1 includes a driving section and an illuminating section comprised of the motor 16 and the lamp 38 respectively, and a driver circuit for driving them, or more specifically, motor drive circuits 327, 328 comprised of a relay and a transformer 314, and a lamp drive circuit 329 comprised of a relay. The control device 13 is connected to the body 1 by way of eight wires. The primary source voltage supplied by the power cord 11 is reduced to AC 14 V by the transformer 314, and converted into a constant voltage to DC 10 V by the constant voltage circuit 315. The outputs of the upper limit switch 30, the lower limit switch 31 and the obstruction detection switch 52 are applied to the interface circuits 317, 318 and 319 including resistors and capacitors, the outputs of which are in turn applied to the logic processing circuit 311 respectively.

The output signal from the operating push button switch 12 is applied to the interface circuit 320 including a resistor and a capacitor, the output of which is applied to the logic processing circuit 311. The output of the logic processing circuit 311 is applied to the drive circuit 322 including a transistor, thereby driving the drive circuit 327 including a relay for driving the motor 16 forwardly. The drive circuit 322 including a transistor, in turn, is impressed with the output of the logic processing circuit 311, thereby driving the drive circuit 328 including a relay for reversely driving the motor 16. As a drive circuit for turning on and off the lamp 38, the drive circuit 329 including a relay is driven by the logic processing circuit 311 through the drive circuit 324 including a transistor for driving the relay of the drive circuit 329.

A door indicator circuit 325 for indicating the conditions of the garage door 6 and an intruder preventing alarm circuit 326 which are included in the output circuits of the logic processing circuit 311 will be explained in detail later.

The push button switch 12 is a door operating switch mounted on the base of the control device 13, apart from which there is provided a ratio control operating command system utilizing the transmission-receiving functions. This is for operating the door from a position distant from the garage and used an electric wave of UHF band. For operation, first, the bit setting section contained in the transmitter 331 and the bit setting circuit 321 within the control device 13 are set appropriately. The data supplied sequentially from the transmitter 331 include bit data thus set. The format of the data will be explained later in detail. The data thus supplied are modulated and converted into a binary number signal at the receiving circuit 330 and applied to the logic processing circuit 311. The receiving circuit used in this case mainly comprises a super-regeneration circuit. The date supplied are compared with the data stored in the bit setting circuit 321 sequentially, and only when all the bits are coincident, they are processed as an operating signal. Naturally, if bits are set improperly, the garage door is incapable of being operated.

In addition, there is provided an additional circuit 316 having the function to set the on time of the lamp 38.

Figure 9:
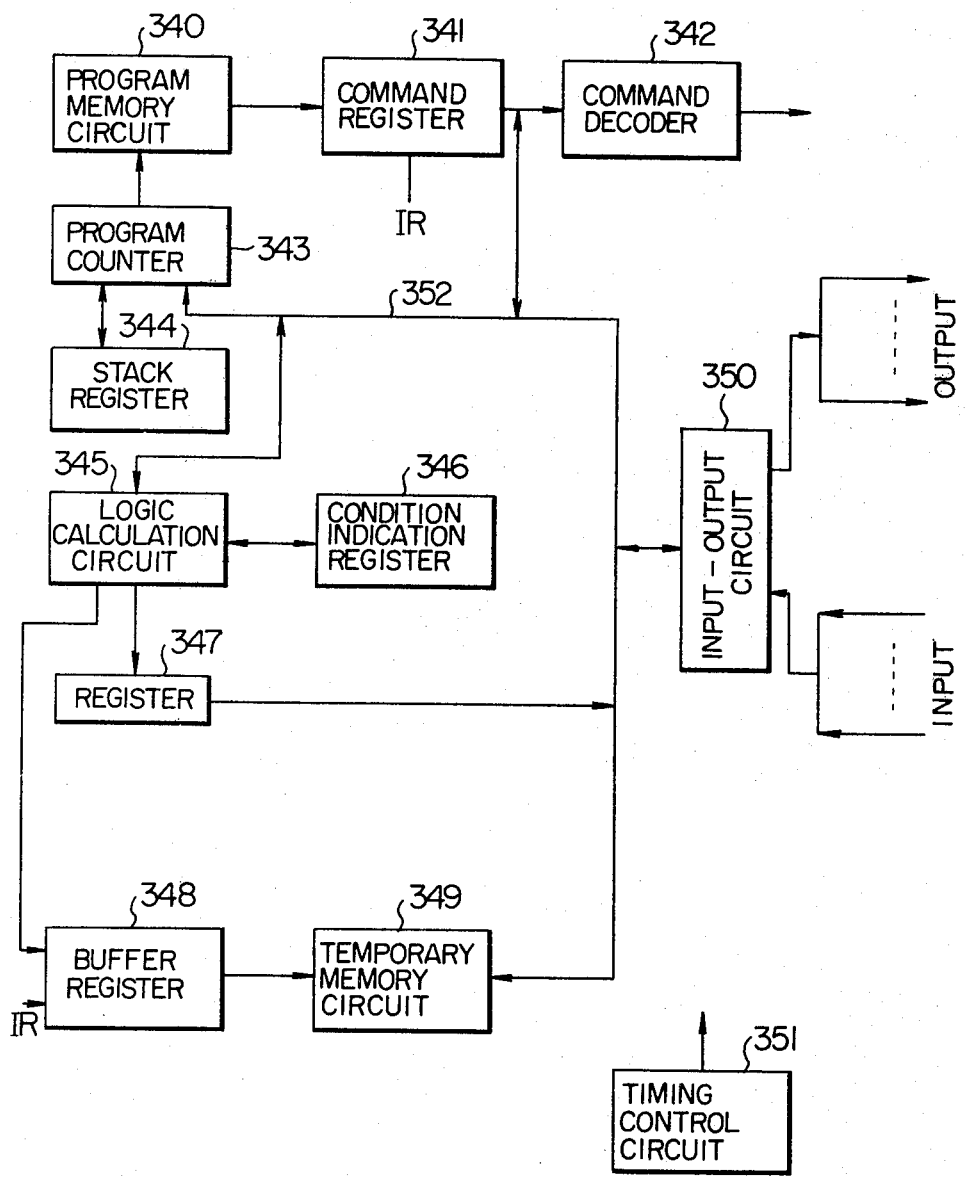
FIG. 9 is a diagram showing a logic processing circuit.

Next, the configuration of the logic processing circuit 311 will be explained with reference to FIG. 9. In order to control the garage door in optimum manner, the circuit 311 comprises a program memory circuit 340 (which in this case is a read-only memory (ROM)) for storing programmed data on the processing sequence in advance, a command register 341 for temporarily storing a command code read out of the program memory circuit 340, and a command decoder 342 for decoding the command code stored in the command register 341. The entire circuits are operated in response to a timing pulse produced from the timing control circuit 351 for controlling the operation timing of the entire circuits and the command code. A program counter 343 is provided for designating and updating an address of the command code for the program memory circuit 340. The program counter 343 is connected with a stack register 344 used for storing the return address in the case of a skip such as a subroutine jump.

Further, the circuit 311 comprises a logic calculation circuit 345 for logic operation, a condition indication register 346 for temporarily storing the result of the logic calculation, a register 347 such as an accumulator used for logic calculation, and temporary memory circuit 349 (which employs a random access memory (RAM)) for storing the result of logic operation or a status flag such as the present condition of the garage door ("1" in operation, and "0" in stoppage). A buffer register 348 is addressed by the logic calculation circuit 345, and the main circuits are connected by a bus line 352. The bus line 352 is also connected with the input-output circuit 350, so that the input-output condition applied through the bus line 352 is processed by logic decision means including the logic calculation circuit 345, the register 347 and the condition indication register 346.

The temporary memory circuit 349 which plays an especially important role in the above-mentioned processing in this circuit configuration will be described below with reference to FIG. 10.

As explained above, the temporary memory circuit 349 is used for temporary storage of the result of calculation or condition flags. The embodiment under consideration has a map area of 22 words. These condition flags are assigned with three words of 0, 1 and 2. The individual flags will be defined later with reference to the attached flow charts.

The 12 words from 10 to 21 are used as timer elements. A basic timer $TM_1$ makes up the essence of all the timers, which timer operates at 15.625 msec in this embodiment. This figure is obtained by counting a predetermined number of steps in view of the fact that the time required for the processing step for each program is known in advance. In other words, the embodiment under consideration of this invention uses no timer system which is comprised of external hardware.

These condition flags and timers are updated sequentially in accordance with their processing steps, so that the resulting data and the command codes stored in the program memory circuit are used for logic decision at the logic calculation circuit 345, thus determining an optimum program processing.

Next, the sequence of operation of the garage door according to the present invention will be explained specifically.

The operation sequence of the garage door is already explained with reference to FIG. 6. Before referring to the flow charts, items to which special attention shall be paid will be described in connection with the date to be processed.

(1) Discrete input signal control

This is for discrimination whether the input signal from the operating push button switch or the receiver is a new signal or a continued signal. As one method for this discrimination, the timer $TM_4$ is set after the input signal is turned off, so that if an input signal is applied anew before the time over, it is determined as a continued signal, while if the next signal is applied after the time over, it is processed as a new input signal. In the case of the signal applied before time over, the timer $TM_4$ is set anew after that signal is turned off. Further, the embodiment of the present invention under consideration has the following additional features to improve the operating efficiency thereof:

(1) When the door begins to operate, a condition where it is desired to stop the door may occur, such as when an obstruction is present in the way of the door. To meet such a situation, the value of 0.25 seconds is employed for the discrete timer $TM_4$ for the door in operation.

(2) When restarting the door after it has stopped, it is necessary to provide a sufficient length of door stoppage time in order to reduce any great shock load which otherwise might be exerted on the driving section or the door. Our experiments confirmed that the rotational inertia of the motor completely disappears within about 0.15 seconds, and as a result the value of 0.5 seconds is employed for the discrete timer $TM_4$ in stationary state.

(2) Number-of-starts control

The motor used for the garage door is generally rated for a short time, and if it is operated continuously in repetitive fashion, the thermal switch 192 for the motor is actuated. As a result, unless the motor housing is cooled, the thermal switch 192 is not restored, thus rendering the garage door inoperative for about 20 minutes. Such a situation is not likely to occur under normal operating conditions but may be caused by mischief of children in most cases. Especially when children's mischief causes very frequent actuations of the thermal switch 192, the motor life is shortened undesirably on the one hand and a serious accident may occur on the other hand. As one method for preventing such an unfavorable situation, a number-of-starts control algorism as shown in FIG. 11 is employed in this embodiment.

(1) The timer $TM_{10}$ is set at 2 minutes after the door has stopped.

(2) If a restart operating command is applied before time over of the timer $TM_{10}$ such as in condition I, the ED counter i.e., the number-of-starts counter is stepped forward.

(3) In the event that a restart operating command is applied after time over of the timer $TM_{10}$ such as in the condition II, the ED counter is kept in the same state.

(4) If a restart operating command fails to be applied within six minutes following door stoppage such as in the condition III, the ED counter is cleared. The timer $TM_{11}$ is used for this purpose.

(5) If the ED counter reaches the valve 12 after the processes (2), (3) and (4) above, any operating command is rejected for subsequent six minutes. Thus the door is rendered operable again six minutes after.

(3) Open door indicator (hereinafter sometimes referred to as ODi)

Figure 12:
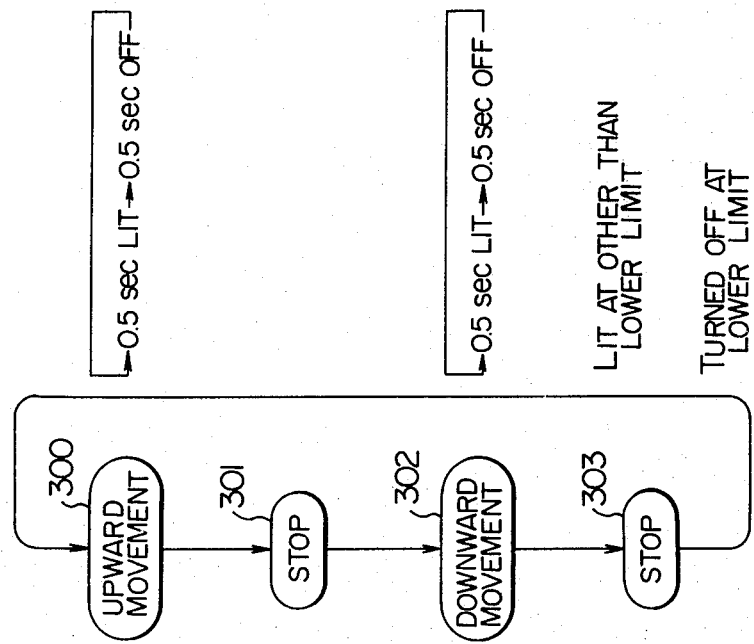
FIG. 12 is a flow chart for a door indicator.

This is for indicating the condition of the garage door shown in FIG. 1 and comprises such specific elements as a lamp and a door indicator circuit 325 for turning on and off a light-emitting diode. An example of the light-emitting diode turned on and off is shown in FIG. 12.

(4) Double safety control

In the case where the upper limit switch 30 or the lower limit switch 31 for setting the door motion range gets out of order, the door runs against the floor if going down or runs against the upper stopper if going up, thus actuating the obstruction switch 52. If the obstruction switch 52 is out of order, however, the door continues to be pressed against the obstruction strongly until the motor generates a lock torque and turns on the thermal switch 192. This condition is not desirable for safety and must be prevented in the manner mentioned below. In view of the fact that the distance covered by the door is limited to, say, 9 feet or 2.7 m, the time required for coverage is naturally limited. For instance, if the door runs at the speed of 10 m/min., the time required $T_T$ is 16 seconds (2.7 divided by 10, and the resulting minutes converted into seconds). In the event that with the timer $TM_8$ set after starting the operation of the door, the upper limit, lower limit or obstruction signal fails to be applied before time over of the timer $TM_8$, the condition is judged as abnormal and the obstruction detecting processing function is performed. This function is effective to secure safety in that the motor is stopped within a predetermined time in the case where, for instance, the door fails to operate due to a fault of part of the driving system or specifically, the turning effort is not transmitted due to a belt slip which heats the belt and the belt is liable to be broken.

(5) Obstruction ignoring control

Generally, the friction is divided into static and dynamic frictions, the former being greater than the latter. This is also the case with the door garage. At the time of starting the operation of the garage door, for instance, a great force is required, although during the door operation, so great a power is not required. In order for the obstruction detection switch 52 to fail to be actuated at the time of door operation start, an operation setting value must be made great, with the result that the ability to detect an obstruction against the door in operation represents a great value. This contradicts the small power for obstruction detection which is required for high door operating efficiency and safety. To overcome this problem, this embodiment of the invention is such that the obstruction detection is ignored for a predetermined length of time, or one second in this case after starting the door operation. This is based on the assumption that every door remains in adequately steady operation at least for one second after start.

(6) Upper-lower limit switch control

It is normally impossible that the upper limit switch and the lower limit switch are actuated at the same time. In abnormal cases, however, such a condition may occur. The contacts of the upper limit switch 30 may be in fusion-closed when the lower limit switch 31 is on as the door is at the lowest position, or part of the wiring may be broken and come into contact with the chassis. By contrast, when the door is at the uppermost position and the upper limit switch 30 is on, the contacts of the lower limit switch 31 may be closed by fusion or part of the wiring may be broken and in contact with the chassis. In still another case, the wiring may be broken or the contacts may be broken for both the upper and lower limit switches at the same time. In such a case, the door is kept stationary in spite of application of an operating input signal or regardless of the simultaneous application of the limit switch signals.

(7) Lamp-lit time control

The additional circuit 316 shown in FIG. 8 is adapted to set the lamp-lit time at two or six minutes. According to the embodiment of the invention under consideration, the lamp is lit upon starting the door operation, and after the door has stopped, the timer $TM_{12}$ is set as predetermined, so that the lamp may be extinguished by time over of the same timer $TM_{12}$.

(8) Received signal control

The signal transmitted from a radio control transmitter is demodulated into a binary number by the receiving circuit 330 and applied to the logic processing circuit 311. A format of such an input signal is shown in FIG. 13. For the purpose of classification in the communications field, this format belongs to NRZ (Non return zero) the specification of which will be described below.

(1) The synchronizing signal SYNC has 16 bits. The length of this synchronizing signal SYNC is counted, and if it is within a predetermined range, the signal is processed as a synchronizing signal. First, the length of the synchronizing signal is taken as 1/16, and thus a sampling period is determined.

(2) The sampling is started from the fall of the synchronizing signal SYNC. Only for the start bit ST, however, the sampling length is set at 1/32. The start bit is kept always "0".

(3) After sampling check of the data of 6 bits, it is confirmed that the stop bit SP is "1". From the fall of this stop bit SP, the next sampling is started. By doing so, the sampling error accumulation can be retained in eight bits.

(4) After completion of the checking "1110" of the fram stop bit FSP, the signal is processed as an operating signal.

Figure 14:
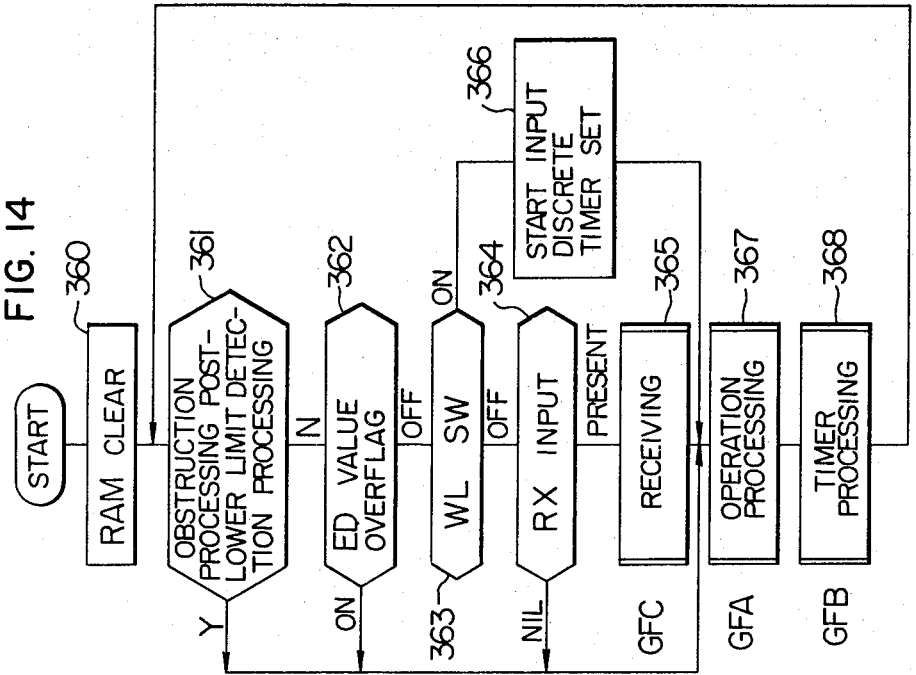
FIGS. 14 to 27 show flow charts of various operations.

The main flow chart according to the present invention is shown in FIG. 14. The processing steps are started after power is thrown in. First, the RAM clear step 360 is taken in order to set the temporary memory circuit 349 at initial condition. Next, the obstruction processing and post-lower limit detection processing 361 is checked. The obstruction processing represents the condition 310 in FIG. 6, and the post-lower limit detection processing represents the condition 309. During these processes, the door is inoperable by either the push button switch or the transmission-receiving. While these processes are not going on, the ED (number of starts) value overflag 362 is checked, and if the flag is "1", the door is also inoperative by the push button switch or the transmission-receipt. If the flag is "0", the on-off of the push button switch (hereinafter referred to as WL SW) is checked. When WL SW 363 is on, the start input discrete timer set 366 is taken. If WL SW 365 is off, in contrast, the receipt (hereinafter be referred to as Rx) which may input 364 is checked, and if it is at "1" level, transfer is made to the next receipt processing step 365. Then, through the operation processing 367 and the timer processing 368, the obstruction processing and the post-lower limit detection processing 361 is resorted to again, thus forming one cycle.

In this main flow chart, the operation process 367 will be explained below with reference to FIGS. 15 to 23.

Figure 15:
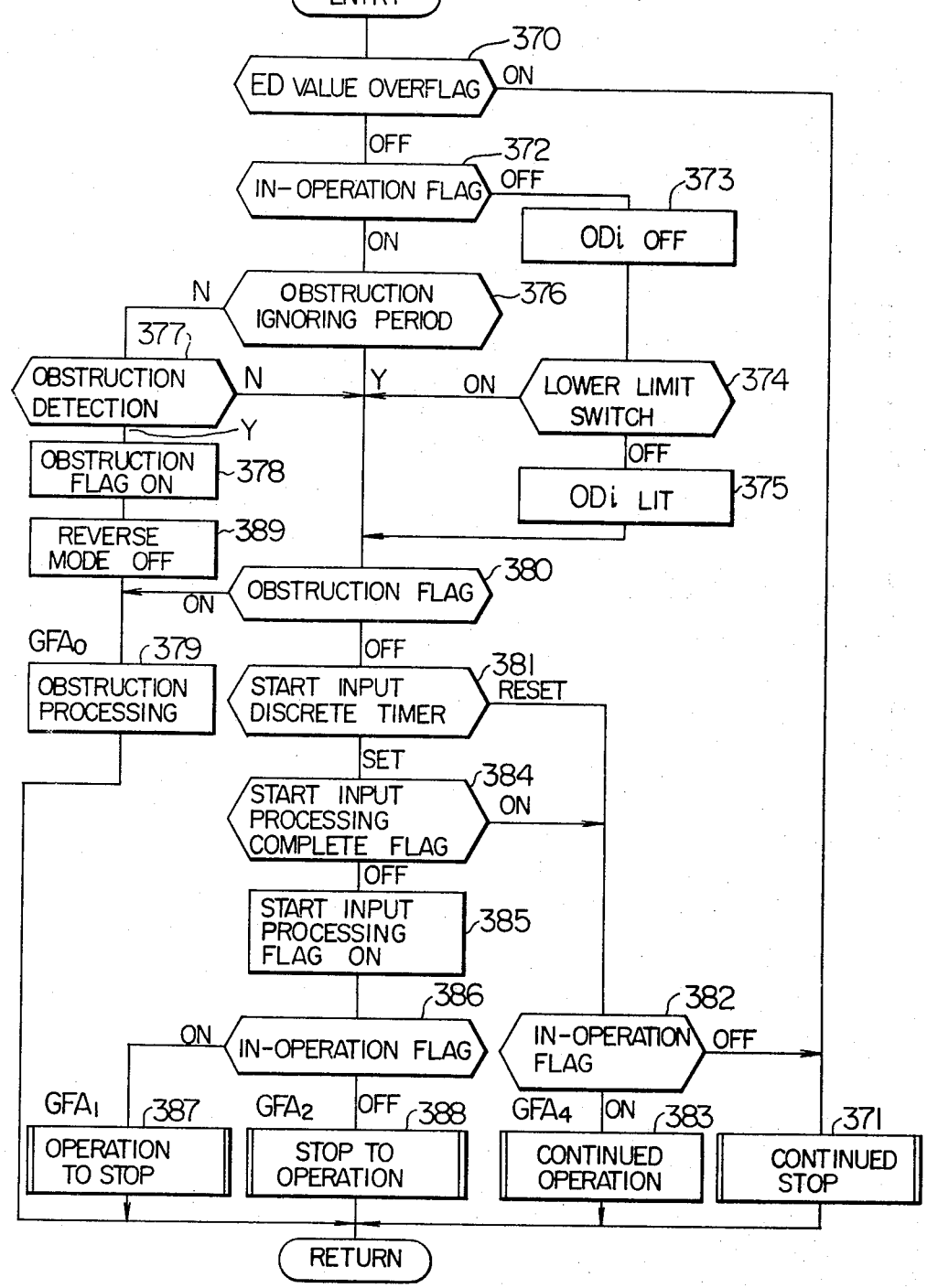

The main flow chart for operation processing is shown in FIG. 15. The ED value overflag 370 is checked. As explained with reference to FIG. 11, this ED value overflag 370 is raised when excessively frequent starts are detected during a limited time. In the case of flag on, the continued stop processing 371 is taken, so that the operating mode is in stoppage. When the flag is off, on the other hand, the in-operation flag 372 is checked.

When the in-operation flag is off, it means stoppage so that the open door indicator circuit 325 (hereinafter referred to as ODi) for indicating the door condition is temporarily turned off. After the step 373 of turning off ODi, the lower limit SW 374 is checked to see whether or not the door is located at the lower limit switch. If the lower limit SW 374 is off, the ODi turn on 375 is taken, while if 374 is on, the Odi 325 is kept off. By this process, the stationary condition 301 or condition 303 shown in FIG. 12 is indicated.

If the in-operation flag 372 is on, the obstruction ignoring period 376 is checked. This corresponds to the time of the timer $TM_6$ in the temporary memory circuit. The value of the timer $TM_6$ is checked, and if it is not a set value, one second has not yet passed after door start, so that the obstruction input is ignored. The reason for providing the obstruction ignoring period 376 is explained above and will not be referred to again.

If it is not in the obstruction ignoring period, the door in steady movement is indicated, and the obstruction detection 377 is checked to determine the presence or absence of an obstruction. If an obstruction signal is applied, the obstruction processing 379 is taken after the obstruction flag on 378 and the reverse mode off 389 processing.

In the obstruction ignoring period 376, it is determined whether the obstruction flag 360 is on or off. In the case of the obstruction flag on, the obstruction is being processed and the obstruction processing step 379 is taken. If the obstruction flag is off, by contrast, it is determined whether the start input discrete timer 381 is set or reset. This corresponds to the timer $TM_4$ in the temporary memory circuit. The timer $TM_4$ is set at 0.25 seconds when the door is in operation and at 0.5 seconds when the door is stationary. That the timer $TM_4$ is reset is indicative of the fact that no operating signal is applied, and it is necessary to continue the same door condition. Thus the in-operation flag 382 is checked, and if this flag is on, the door is in operation, so that the continued operation processing step 383 is taken, while if the same flag is off, the continued stoppage processing step 371 is taken.

When the start input discrete timer 381 is set, the start input process complete flag 384 is checked. In other words, it is determined whether quite a new operating signal or a signal once processed in involved. If the flag 384 is on, the same door condition is required to be continued, and a jamp is made to the step for checking the in-operation flag 382.

In the case where the start input complete flag is off, the start input complete flag on 385 is taken, followed by the checking of the in-operation flag 386. If this flag is on, on the other hand, the door is in operation and is required to be stopped. For this purpose, steps are taken from operation to stop 387.

In the case where the in-operation flag 386 is off, by contrast, the door is stationary and is required to be started. For this purpose, steps are taken from the stop to operation 388.

Figure 16:
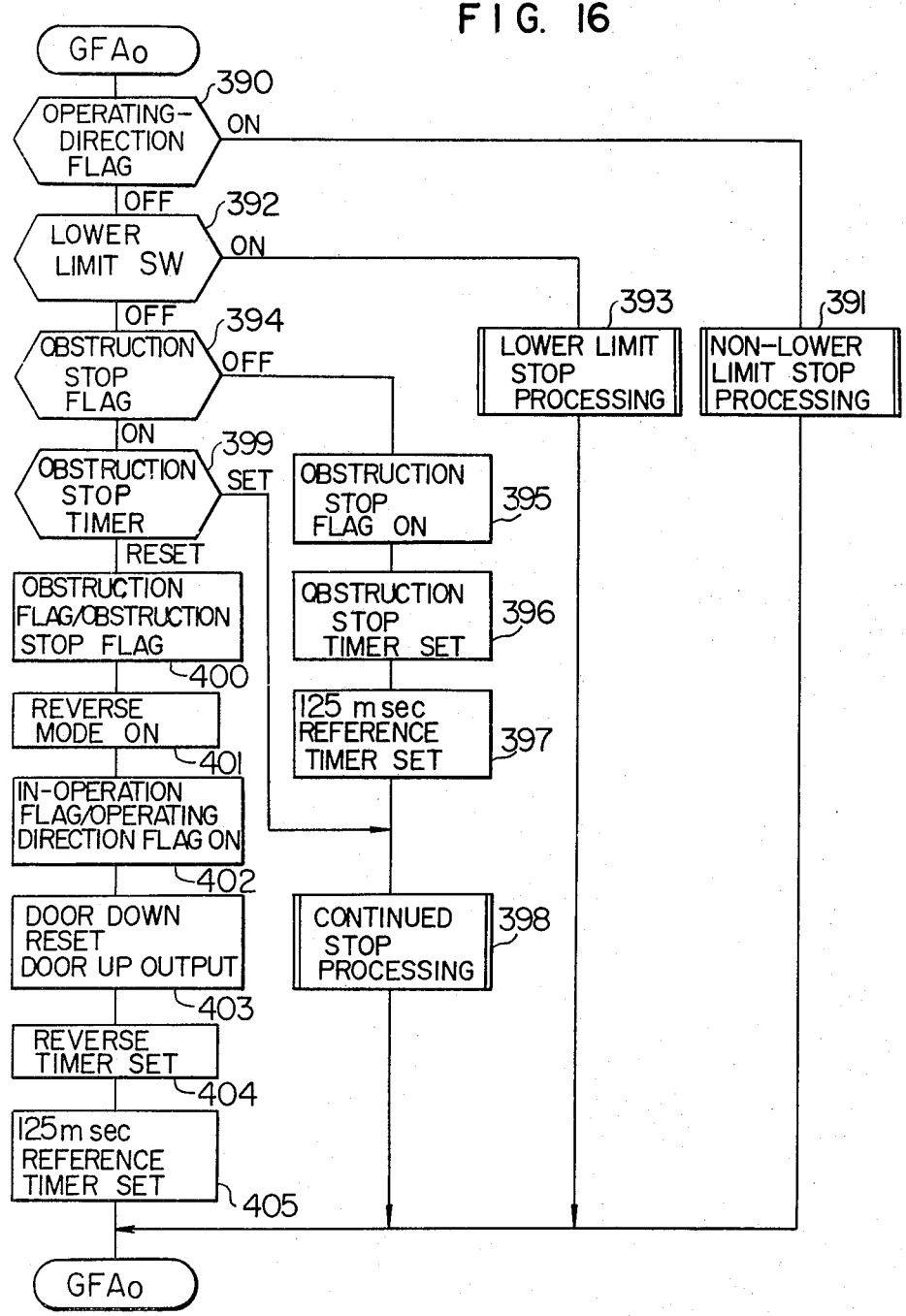

Next, the obstruction processing step 379 will be explained with reference to FIG. 16. This process includes the conditions 308, 309 and 310 shown in FIG. 16. The condition 309, however, concerns the obstruction detected during the fixed-time downward movement.

If it is found that the operating direction flag 390 is on as a result of checking the same, it means an upward movement and therefore the non-lower limit stop processing step 391 is taken for stopping the door. If the flag 390 is off, it means a downward movement, and therefore the lower limit SW 392 is checked. If the lower limit SW 392 is on, the condition 309 is involved, so that there is no need for reversing but the lower limit stop processing step 393 is taken.

In the case where the lower limit SW 392 is off, the reverse upward movement is required. Next, if the checking of the obstruction stationary flag 394 shows that it is off, the obstruction processing step 305 is required to be taken. In other words, the obstruction stationary flag on 395, the obstruction stop timer set 396 (corresponding to the timer $TM_6$ in FIG. 10), the 125 msec reference timer set 397 (corresponding to the timer $TM_3$ in FIG. 10), and the continued stop processing step 398 are taken.

In the case where the obstruction stationary flag is on, the obstruction stationary timer 399 is checked, and the door is required to be kept stationary until it is reset. The set time is 0.5 seconds in the present embodiment of the invention.

Assume that the stop timer 399 is reset. In order to realize the condition 306 in FIG. 6, the obstruction flag/obstruction stop flag off 400, the reverse mode on 401, the in-operation/operating direction flag 402, the door downward movement reset/door upward movement output 403, the reverse timer set 404 (corresponding to the timer $TM_6$ in FIG. 10), and the 125 msec reference timer set 405 (corresponding to the timer $TM_3$ in FIG. 10) are taken.

Figure 17:
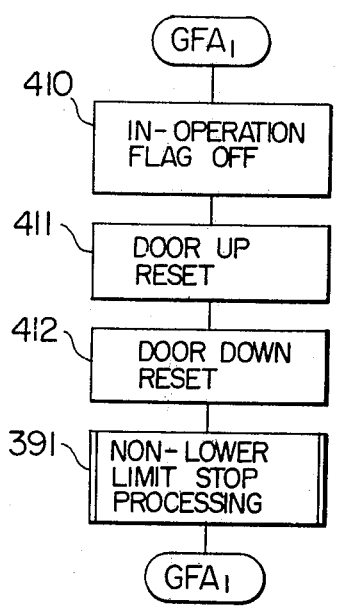

Next, the operation-to-stop processing step 387 will be explained with reference to FIG. 17.

As a process for stoppage, the in-operation flag off 410, the door upward movement reset 411, the door downward movement 412 and the non-lower limit stop processing step 391 are taken.

Figure 18:
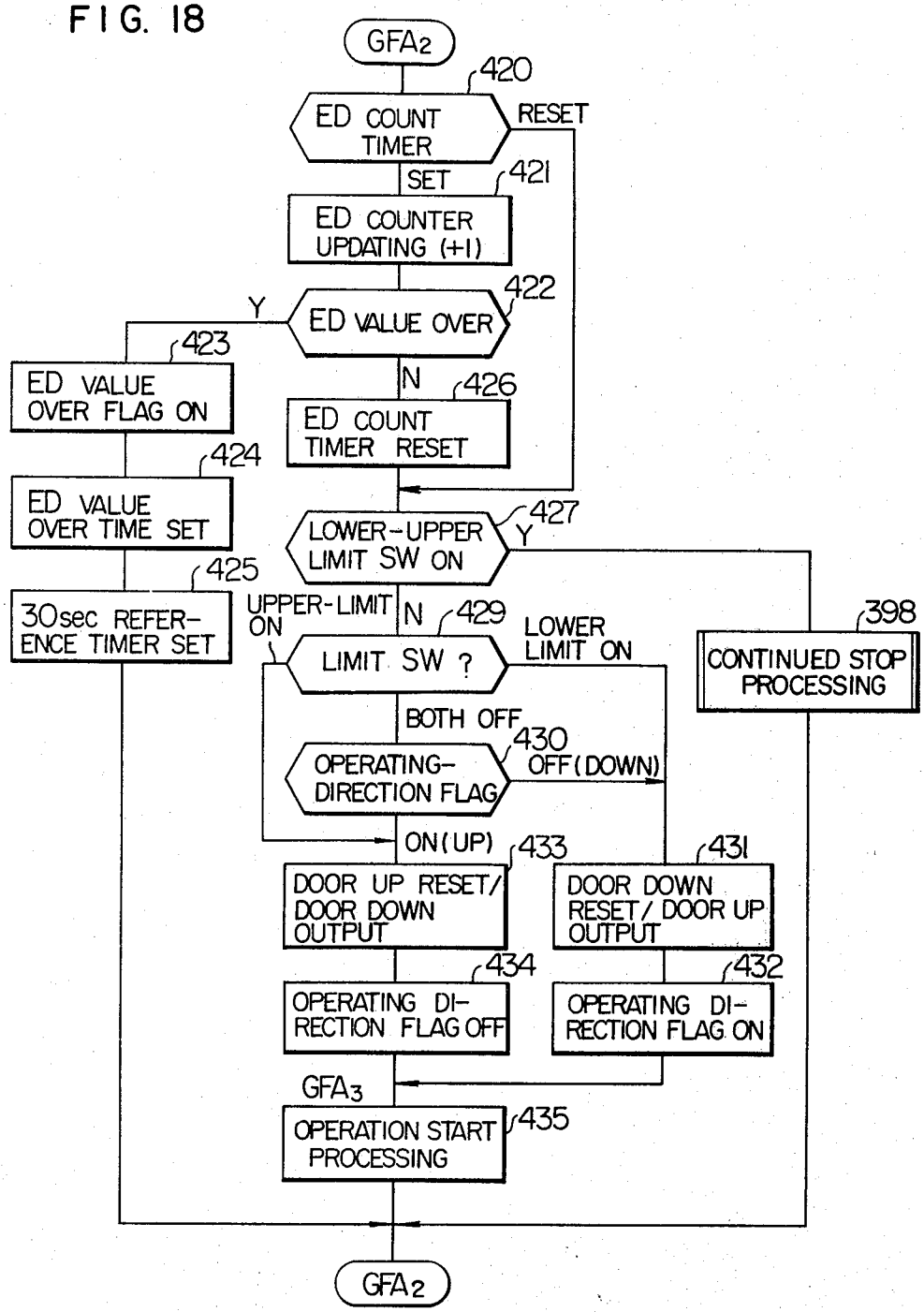

Now, the stop-to-operation processing step 388 will be explained with reference to FIG. 18.

First, it is determined whether the ED counter timer 420 is set. This corresponds to the timer $TM_{10}$ in FIG. 10. If it is set, the condition I shown in FIG. 11 is involved, so that the ED counter updating (+1) 421 is taken. If the timer is reset, on the other hand, it means the condition II.

Then the ED value over 422 is checked. If the ED value is exceeded, the ED value over flag on 423, the ED value over timer set 424 and the 30 sec reference timer set 425 (corresponding to the timer $TM_9$ in FIG. 10) are taken.

In the event that the ED value is not exceeded, however, the ED count timer reset 426 is taken for the purpose of initial clear of the ED counter.

Next, the upper-lower limit SW on 427 is checked. This is for determining a fault if both the upper and lower limit switches which are not normally simultaneously operable are on, in which case the continued stop processing step 398 is taken thereby keeping the door inoperative.

The limit Sw 429 is checked. If the upper limit Sw is on, the downward movement output is used; if the lower limit SW is on, the upward movement output is used; and if neither the upper or lower limit switch is on, the operating direction flag 430 is used, all to determine a mode. The limit SW input signal is given priority over the operating direction as a history mode. The operating direction flag, which is a stored in the temporary memory circuit 349 in FIG. 9, is off in view of the fact that it is entirely cleared at the time of power throw-in. In other words, the flag is reversely indicative, i.e., the flag-off means an upward movement, and the flag-on the downward movement. In the case of flag off, therefore, the door downward movement reset/door upward output 431 is taken, followed by the operating direction flag on 432 in order to indicate the downward movement that follows. By these processes, the door operating direction after power throw-in is fixed at upward movement.

In the case where the operating direction flag 430 is on, by contrast, the door upward movement reset/door downward movement output 433 and the operating direction flag off 434 are taken, thus determining that the next operating direction is up. After setting the operating direction flag, the operation start process 435 is taken.

Figure 19:
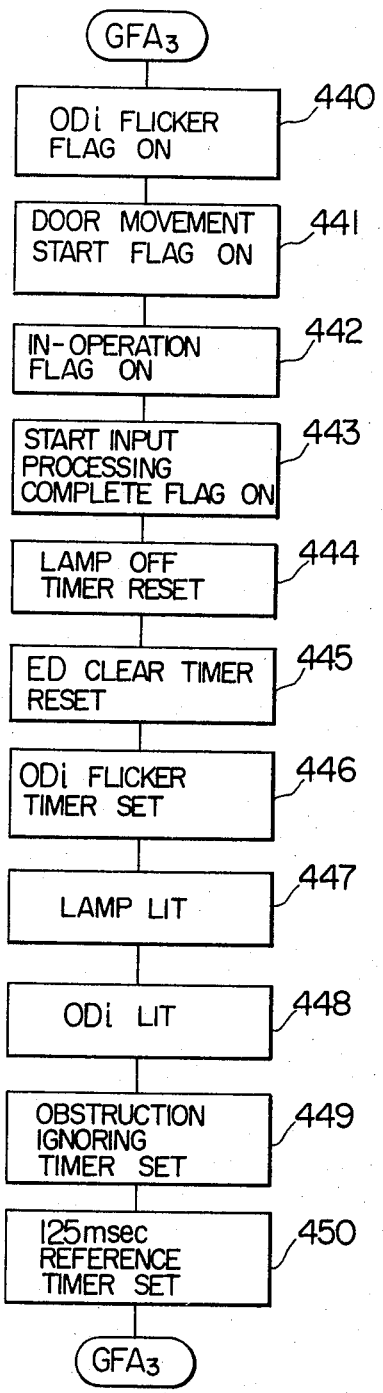

Next, the operation start processing step 435 will be explained with reference to FIG. 19.

In this process, before starting the operation, all related flags and timers are set and the lamp-on signal is produced.

Then, the ODi flicker flag on 440, the door movement start flag on 441, the in-operation flag on 442, the start input process complete flag on 443, the lamp off timer reset 444 (corresponding to the timer $TM_{12}$ in FIG. 10), the ED clear timer reset 445 (corresponding to the timer $TM_{11}$ in FIG. 10), the ODi flicker timer set 446 (corresponding to the timer $TM_5$ in FIG. 10), the lamp on 447, the ODi turn on 448 the obstruction ignoring timer set 449 (corresponding to the timer $TM_6$ in FIG. 10), and the 125 msec reference timer set 450 (corresponding to the timer $TM_3$ in FIG. 10) are taken in that order.

Figure 20:
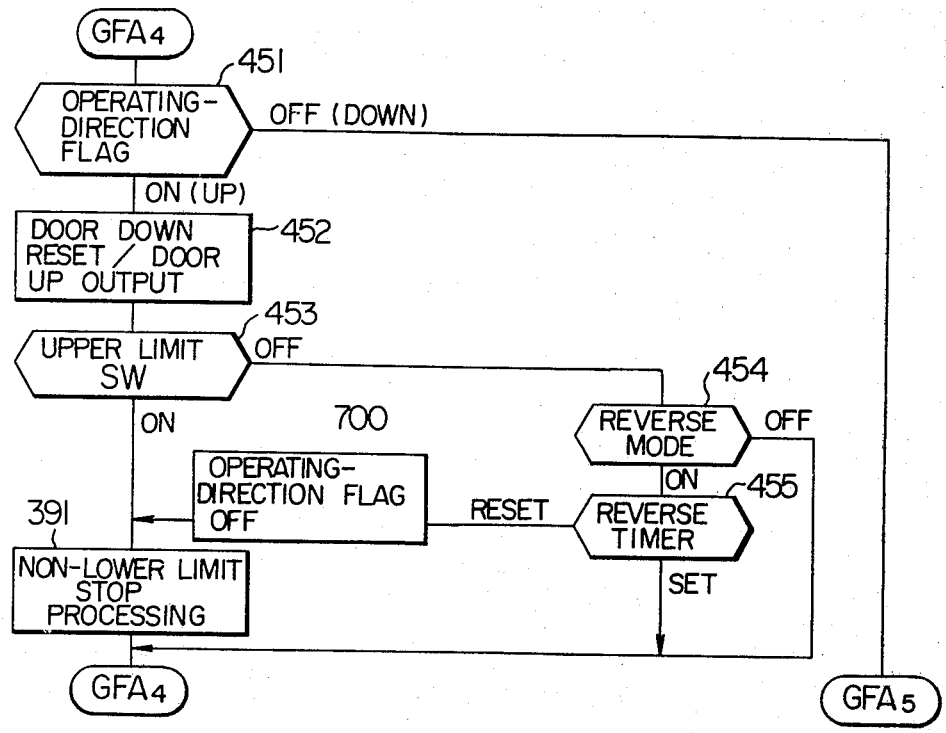
Figure 21:
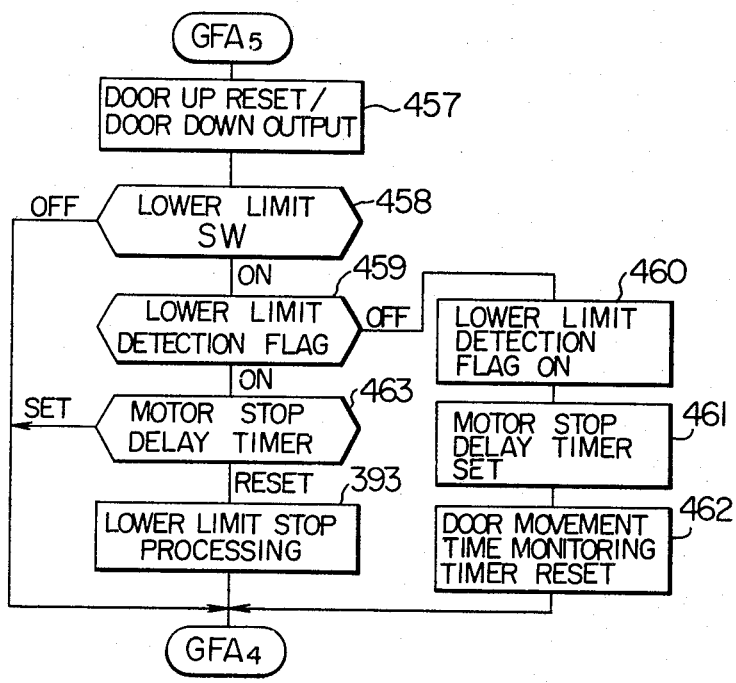

The in-operation processing 383 will be explained with reference to FIGS. 20 and 21.

In this process, the states 304 and 306 shown in FIG. 6 are primarily executed. First, the operating direction flag 451 is checked, and if it is on, the door downward movement reset/door upward movement output 452 is always taken. After that, the upper limit SW check 453 is made, and if it is on, the non-lower limit stop processing 391 is taken. If the upper limit SW is off, the reverse mode 454 is checked. In the case where this mode 454 is on, the reverse timer is checked at 455. This timer is the timer $TM_6$ in FIG. 10, which in reset condition represents the condition 306 of one foot up shown in FIG. 6, and therefore the operating direction flag off 700 is executed. In other words, after moving up by one foot, the operating direction is corrected downward. By doing so, the door is driven to move up again in response to the next operation command shown in FIG. 18. After executing the operating direction flag off 700, the non-lower limit stop processing 391 is executed. When the timer is set by the reverse timer check 455, the operating direction flag 451 is checked again.

The operating direction flag 451 is checked and if it is off, the door upward movement reset/door downward movement output 457 is always repeated. Then, the lower limit SW 458 is checked, and if it is on, the lower limit detection flag 459 is checked. If the same flag is off, by contrast, it is immediately after the lower limit input, so that the lower limit detection flag on 460 is taken while at the same time taking the motor stop delay timer set 461. This corresponds to the timer $TM_2$ in FIG. 10. Next, the door movement time monitoring timer reset 462 is taken. This corresponds to the timer $TM_8$ in FIG. 10.

In the case where the lower limit detection flag 459 is on, the motor stop delay timer is checked at 463. If it is reset, it confirms that the door has moved down for a predetermined length of time as shown in the state 304 in FIG. 6, and therefore the following step to be taken in the lower limit stop processing 393.

According to the embodiment of the invention under consideration, the timer $TM_2$ is set at 225 msec.

Figure 22:
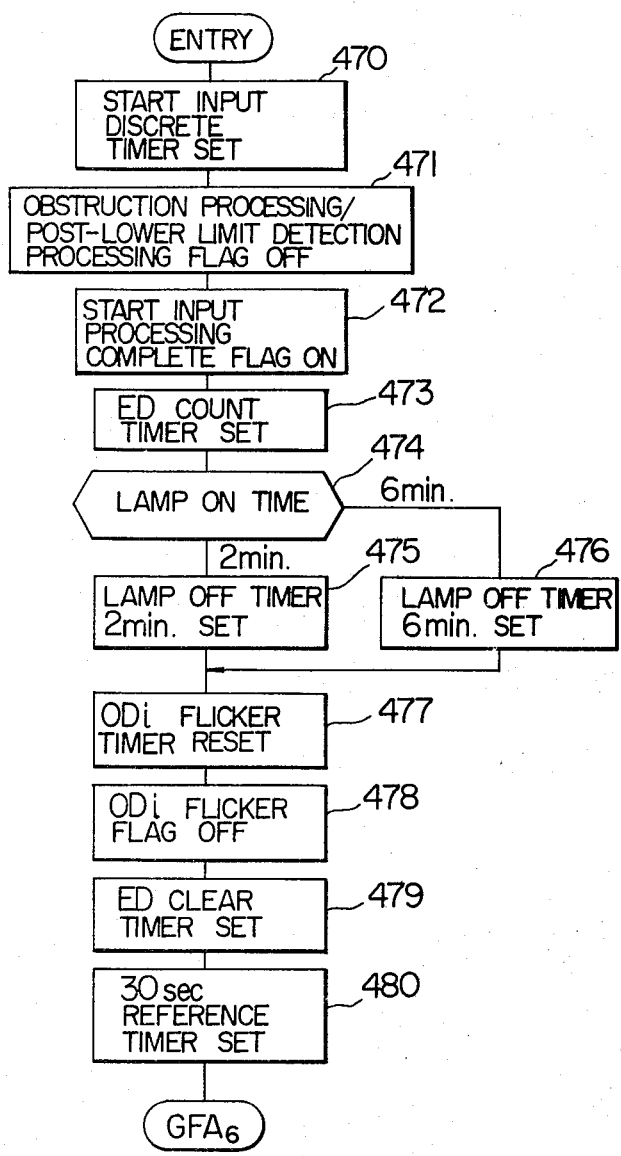
Figure 23:
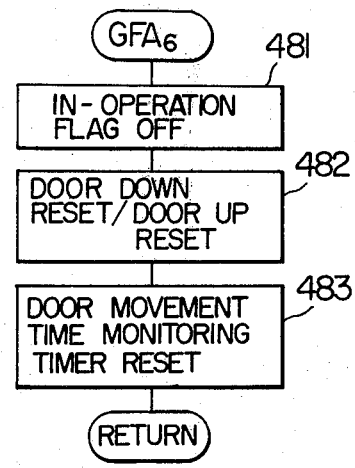
Figure 24:
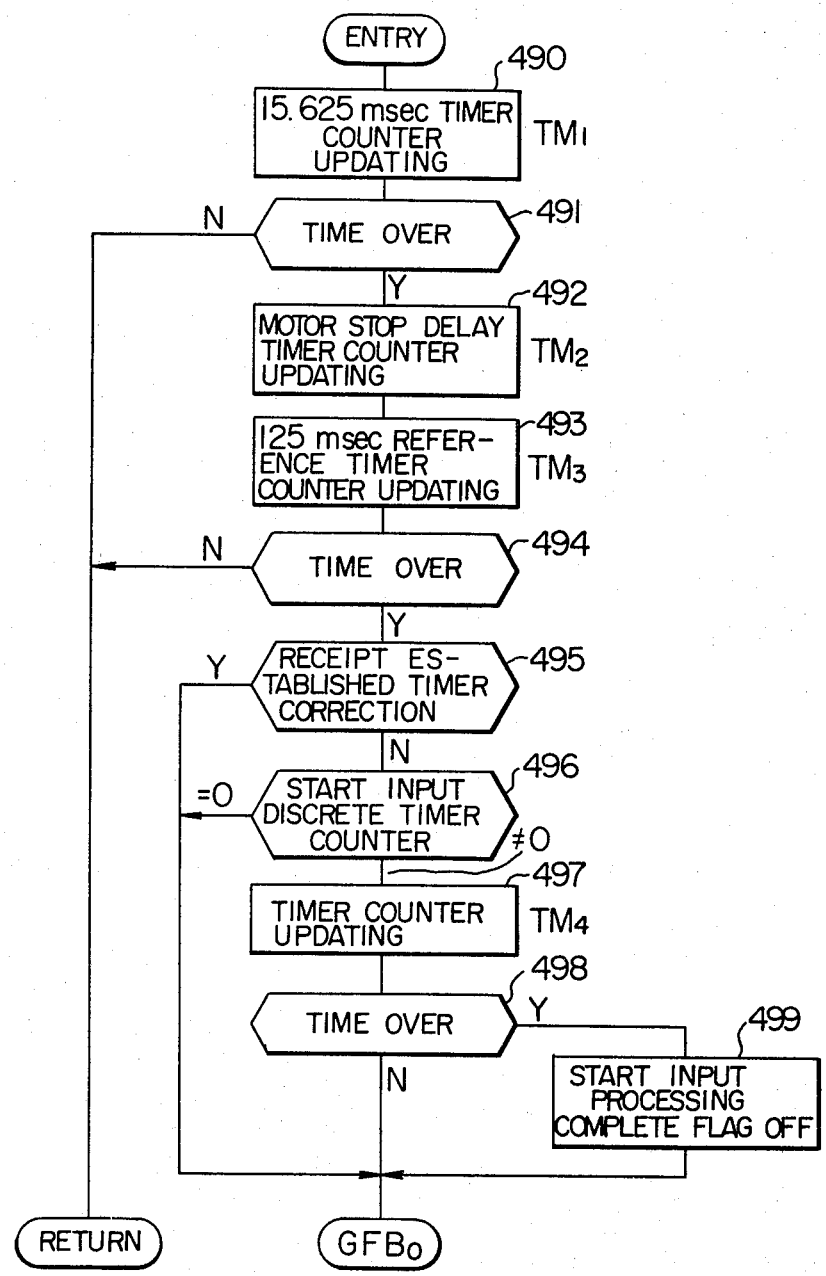
Figure 25:
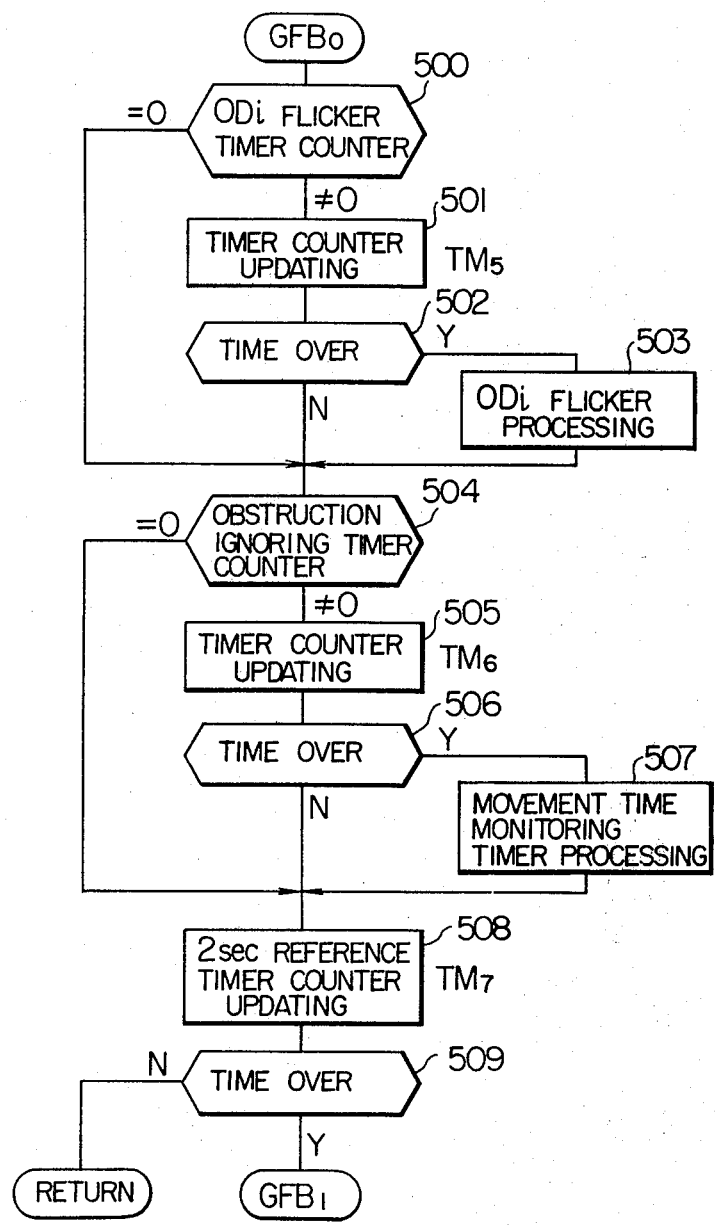
Figure 26:
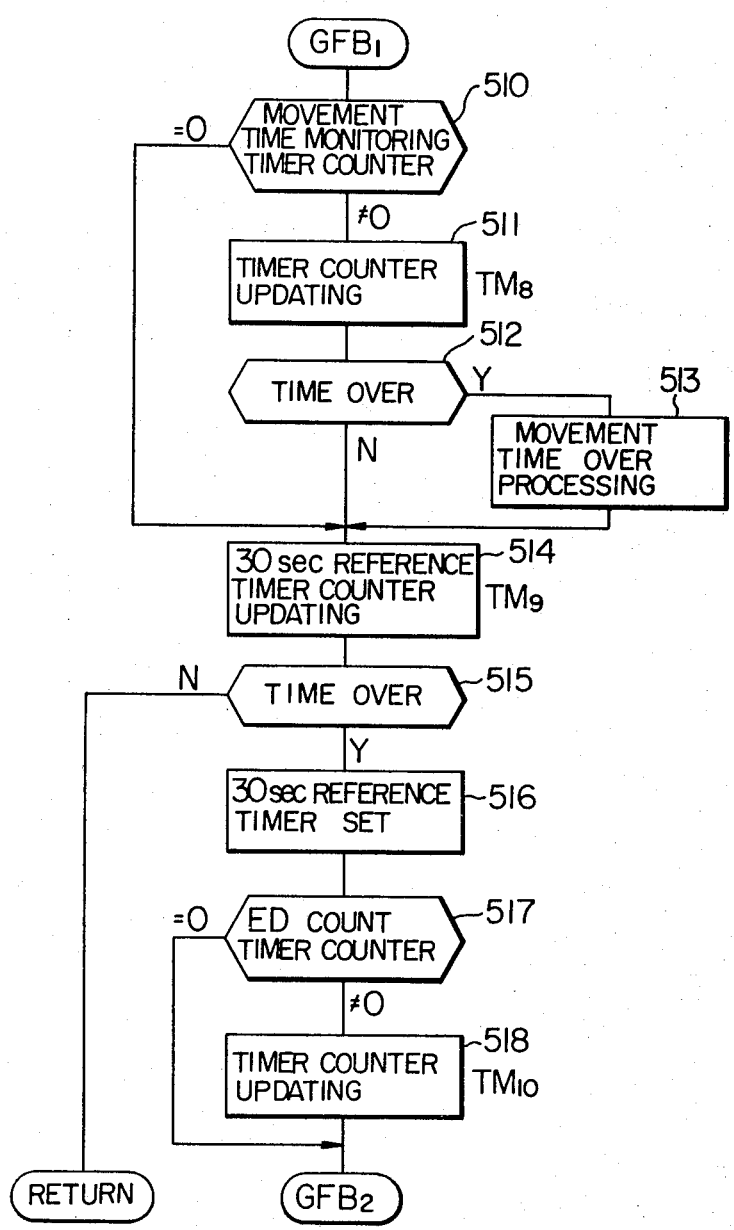
Figure 27:
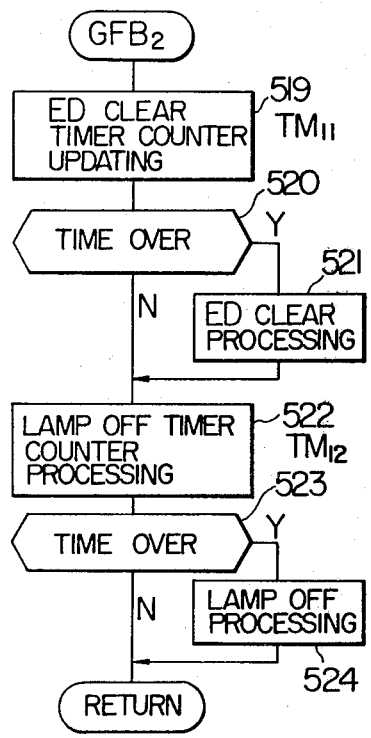

Next, the lower limit stop and non-lower limit stop processing will be explained with reference to FIGS. 22 and 23, and the continued stop processing with reference to FIG. 23.

The start input discrete timer set 470, the obstruction processing/post-lower limit detection processing flag off 471, and the start input process complete flag on 472 are taken. The stoppage in response to the operating command input is considered the same as the stoppage in response to the input to the upper or lower limit switch.

Next, the ED count timer set 473 is taken. This corresponds to the timer $TM_{10}$ in FIG. 10.

In order to determine the lamp-on time, the two-minute or six-minute select signal set by the additional circuit 316 in FIG. 8 is checked at the lamp-on time 474, and also the lamp-off timer two minutes 475 or the lamp-off timer six minutes 476 is selected. Next, the ODi flicker timer reset 477, the ODi flicker flag off 478 and the ED clear timer set 479 are taken. This corresponds to the timer $TM_{11}$ in FIG. 10 which is set at six minutes in this embodiment of the invention. Next, the 30-sec reference timer set 480 is taken.

The next steps to be taken include the inoperation flag off 481, the door downward movement reset/door upward movement reset 482 and the door movement time monitoring timer reset 483 are executed.

The timer processing 368 in the main flow chart of FIG. 14 will be explained below with reference to FIGS. 24 to 27. In the processing sections of this flow chart, the number of steps of each section are counted by itself and used as a timer, and each timer counter corresponds to a related element in FIG. 10. In the flow charts under consideration, marks will be attached to clarify the correspondence on the map.

The 15.625 msec timer counter updating 490 is taken and the time over of the timer $TM_1$ is checked for at the time over 491. One cycle of the main flow chart includes 97 steps. When this is counted in four bits, a time over occurs at the 16th time, resulting in an overflow. One step is 10 $\mu$sec, so that one cycle corresponds to $16 \times 97$ steps $\times 10$ $\mu$sec $= 15.52$ msec. The time of 15.625 msec was considered because of the relation with a higher order counter contents 125 msec, and it is assumed that the basic parts already include an error of about 1%. The output of the time over 491 is produced at intervals of 15.625 msec, which output is processed through the motor stop delay timer counter updating 492 (timer $TM_2$) and the 125 msec reference timer counter updating 493 (timers $TM_3$ which count +2 each), with the result that the overflow time of 125 msec at the time over 494 is assured.

The next step, i.e., the receiving established timer correction 495 will be described later. In the timer correction for this step, the discrete timer is not updated. In the absence of the receiving established timer correction, the start input discrete timer counter 496 is checked. When the count is not zero, the timer counter updating 497 (timer $TM_4$) is executed and checked at the time over 498. If there is a time over, the start input process complete flag off 499 is taken.

The ODi flicker ounter 500 is checked. When the count is not zero, the timer counter updating 501 (timer $TM_5$) is executed and checked at time over 502. If there is any time over, the ODi flicker processing step 503 is taken. In other words, the ODi is made to flicker by the ODi flicker flag, and thus the conditions 300 and 302 in FIG. 12 are executed.

Next, the obstruction ignoring timer counter is checked at 504. If it is not zero, the timer counter updating 505 (timer $TM_6$) is taken and checked at time over 506. If there is a time over, the movement time monitoring timer processing step 507 is taken. At this step, the door movement start flag is made off and the movement time monitoring timer is set.

Up to this point, the 2-sec reference timer counter updating 508 (timer $TM_7$) is executed and checked at time over 509. If there is a time over, it involves the passage of two seconds.

Next, the movement time monitoring timer counter 510 is checked. If it is not zero, the timer counter updating 511 (timer $TM_8$) is taken and checked at time over 512. If there is any time over, the movement time over processing is effected. In this case, the obstruction flag on and the reverse mode off are involved. In other words, a time over occurs 25 seconds after door start in the absence of an input from the upper limit switch, the lower limit switch or the obstruction limit switch. This output is equivalent to the obstruction detection.

Next, the 30-sec reference timer counter updating 514 (time $TM_9$) is taken and checked at time over 515. If there is any time over, the lapse of 30 seconds is involved.

The 30 sec reference timer set 516 is then taken. This is for the reason that the 30-sec reference timer $TM_9$ is based on the timer $TM_7$, and overflow is required at the count 15. The counter for the timer $TM_9$ is set at "1".

The ED count timer counter 517 is checked. If it is not zero, the timer counter updating 518 (timer $TM_{10}$) is taken.

Next, the ED clear timer counter updating 519 (timer $TM_{11}$) is taken and checked at the time over 520.

If there is a time over, the ED clear processing is effected at 521. In this process, the ED counter is cleared and the ED value over flag is turned off, attaining the condition equivalent to the state III in FIG. 11.

Next, the lamp-off time counter updating 522 (timer $TM_{12}$) is executed and checked for time over at 523. If there is any time over, the lamp off processing step 524 is taken.

Prior to explaining the receiving process 365 in the main flow chart of FIG. 14, the transmission-receiving system will be described again.

Figure 28:
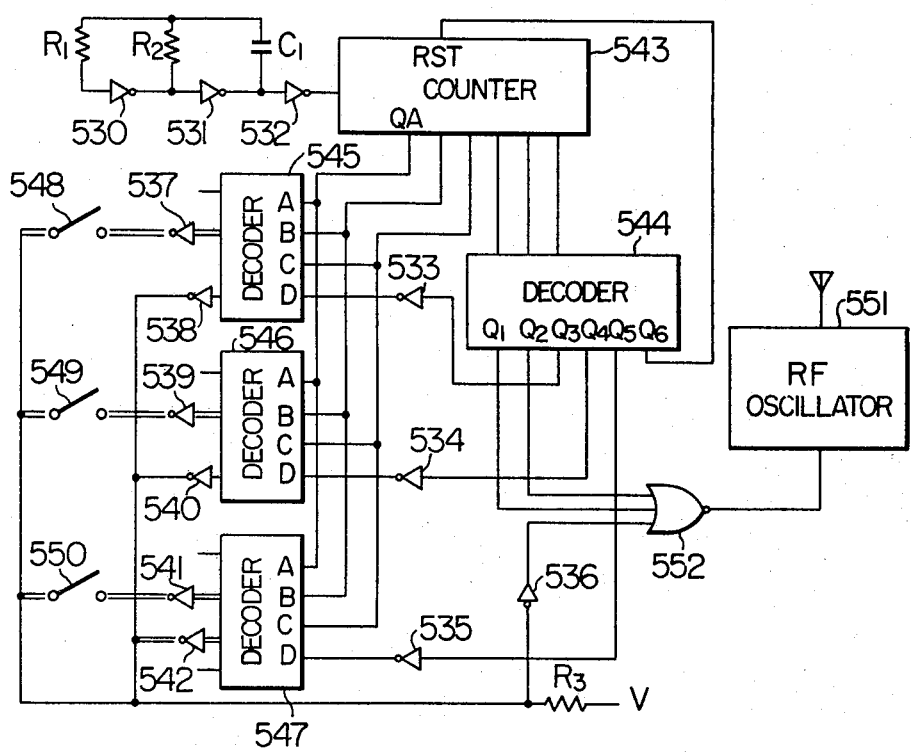
FIG. 28 is a diagram showing the circuit of a radio control transmitter.

An example of the circuit for the transmitter 331 will be explained with reference to FIG. 28. Inverters 530, 531, resistors $R_1$, $R_2$ and a capacitor $C_1$ make up an oscillator circuit, the output of which is applied through an inverter 532 to a counter 543. The three lowest-order bits of the counter 543 are applied to the decorders 545, 546 and 547, while the three highest-order bits are applied to the decorder 544. The outputs $Q_1$ to $Q_5$ obtained by decoding the highest three bits are equivalent to eight times the least bit QA of the counter 543. Thus the outputs $Q_1$ to $Q_5$ of the decoder 544 make up 40 bits. The outputs $Q_1$ and $Q_2$ are applied to a 3-input NAND 552, thereby making up a synchronizing signal of 16 bits. At output $Q_3$, the decoder 545 is selected through the inverter 533, so that the three lowest bits of the counter 543 are decoded and the output of the decoder 545 is applied to an inverter 537 of open drain type (corresponding to six inverters). Thus the same output sequentially scans the bit switch 548 with six contacts providing a bit setting part, and the on-off data is applied to the 3-input NAND 552 through the inverter 536. In similar fashion, by way of the output $Q_4$ of the decoder 544, the decoder 546 is selected through the inverter 534, and the output of the decoder 546 scans the bit switch 549 (with six contacts) through the inverter 539 of open drain type (corresponding to six inverters). Also, by way of the output $Q_5$ of the decoder 544, the decoder 547 is selected through the inverter 535, and the output of the decoder 547 is applied to the inverter 541 (with three inverters) of open drain type, thus sequentially scanning the bit switch 550 with three contacts. The inverters 538 and 540 of open drain type correspond to the stop bit SP, while the inverter 542 with three inverters 3 of open drain type corresponds to one frame of stop bits FSP.

By this operation, the RF oscillator 551 making up a UHF oscillator section is subjected to on-off control by the three-input NAND 552, thus producing an electric wave output of the transmittor 331 as shown in FIG. 13.

The data thus transmitted is received by the receiving circuit 330 including a super regeneration circuit, and then applied to the logic processing circuit 311 including a bit setting circuit 321.

Figure 29:
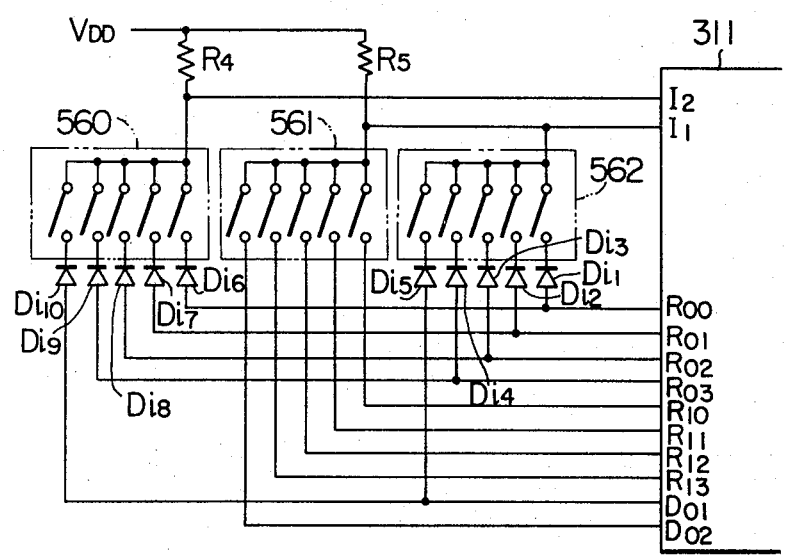
FIG. 29 is a diagram showing a bit-setting circuit.

An embodiment of the bit setting circuit 321 is shown in FIG. 29. This circuit comprises bit switches 560, 561, 562, and diodes $Di_1$ to $Di_{10}$ and sequentially controls the 10-bit outputs of the logic processing circuits $R_{00}$ to $R_{03}$, $R_{10}$ to $R_{13}$ and $D_{01}$ to $D_{02}$, so that only one bit is kept at "1" while the other nine bits are made "0" (in high impedance condition in spite of open drain type), with the result that the on-off data of the bit switches is collected by way of input ports $I_1$ and $I_2$.

Figure 30:
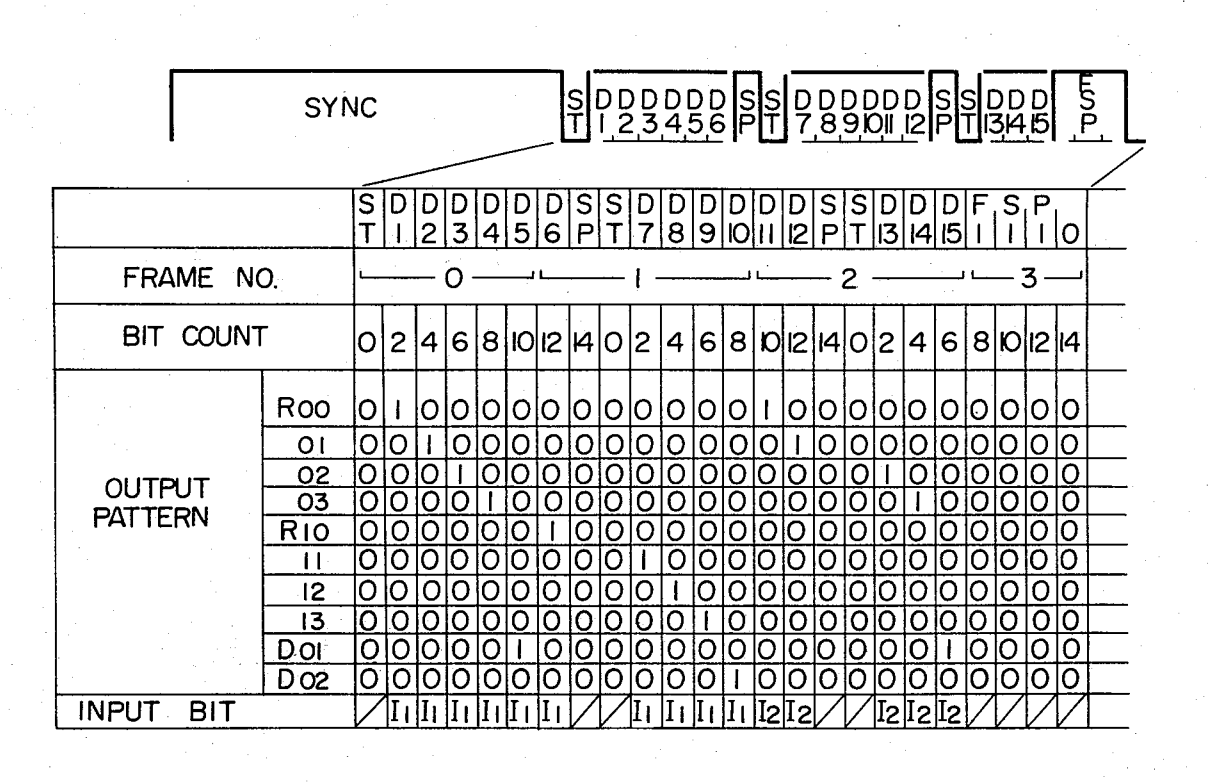

FIG. 30 shows a set pattern for collection of the bit switch data. The frame No. corresponds to the data, the data $D_1$ to $D_5$ corresponding to frame No. 0, the data $D_6$ to $D_{10}$ to frame No. 1, the data $D_{11}$ to $D_{15}$ to frame No. 2, and the frame stop bit to frame No. 3. Also, as a bit counter, an even number is assigned to each bit between start bit SP and stop bit SP. The output pattern and the input port for collection of the bit switch data are also shown.

Next, the receiving process will be explained below with reference to FIGS. 31 to 37. First, explanation will be made with reference to FIG. 31.

Figure 37:
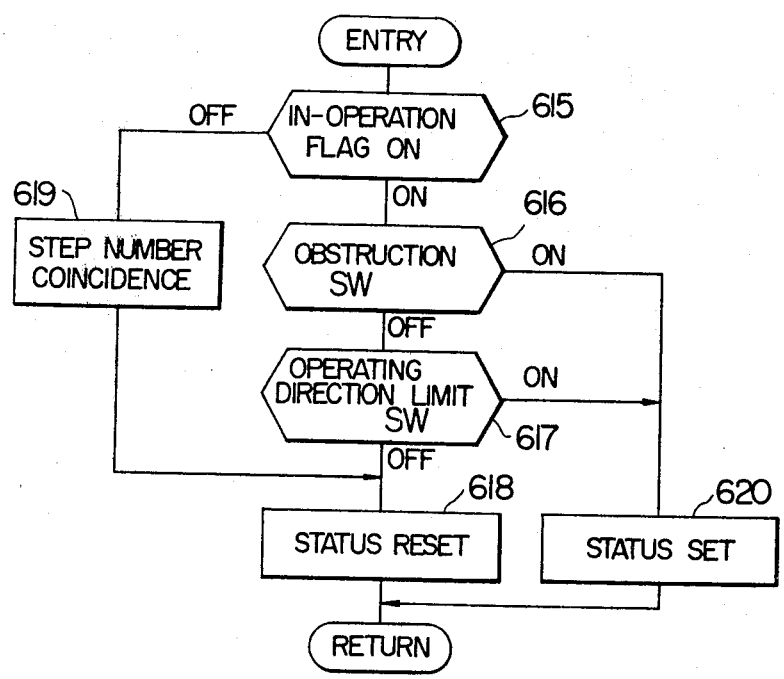

The obstruction limit SW check 570 is for checking the limit SW of an obstruction and the operating direction while the door is in operation. When the door is not in operation, the number of processing steps is rendered coincident, as the detail thereof is shown in FIG. 37. If an obstruction is found by this process or the operating direction limit SW is on, the status flag (located within the condition indication register of FIG. 9) is set.

The next step is the checking of the obstruction limit SW input 571 which is effected by checking the above-mentioned status flag. If the status flag is on, a jump is made to GFC1. When the status flag is off, on the other hand, the sync signal counter updating 572 is taken. The sync signal counter is provided by eight bits as shown in FIG. 10 within the temporary memory circuit 349 shown in FIG. 9. It is determined whether or not the value of the above-mentioned counter is maintained for longer than a predetermined length of time. In other words, the maximum value of the waveform applied as an original sync signal is set. And if the counter value is larger than that maximum value, an abnormality is judged and a jump is made to GFC1.

If the result of the step sync signal counter 2 upper limits 573 is "No", the step "the received data is 0" is taken at 574, thus determining whether or not the data is zero, i.e., whether or not the sync signal is ended. If the data is not zero, the processes are returned to the obstruction limit SW check 570. The loop $L_1$ shown in the drawing is repeated till the received data becomes zero. If the data is zero at the step 574 "received data=0", the sync signal counter 2 lower limit 575 is checked. In other words, the maximum value of the waveform applied as an original sync signal is set, and if the count is lower than that, an abnormal condition is judged and a jump is made to GFC1.

If the result of the sync signal counter 2 lower limit value 575 is "Yes", the DiPSW read output pattern initial value set 576 and the frame No. initial value set 577 are taken as shown in FIG. 30.

Next, the flow chart of FIG. 32 will be explained.

Figure 31:
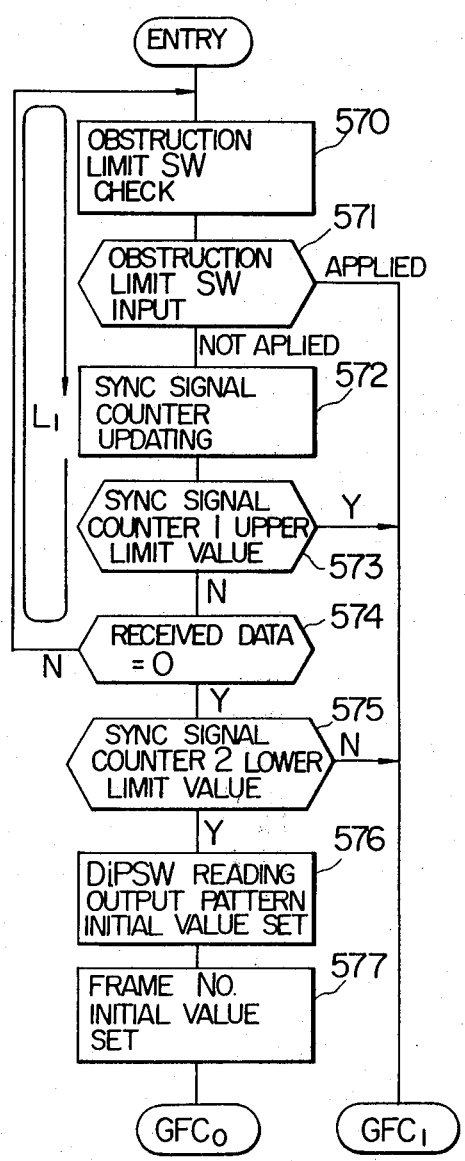

The sampling timing counter initial value set 578 is taken. In this process, with the next bit counter initial value set 579 set, the length of time required for processing the sync signal counter 2 lower limit 575, the DiPSW read output pattern initial value set 576 and the frame No. initial value set 577 in FIG. 31 is corrected as an error before the sampling start.

The obstruction limit SW check 580 checks the obstruction or the operating direction limit switch when the door is in operation. When the door is not in operation, the number of processing steps is made coincident with each other, as the detail thereof is shown in FIG. 37. In this process, in the presence of an obstruction or when the operating direction limit SW is on, the status flag (located in the condition indication register of FIG. 9) is set.

The next process of checking the obstruction limit SW input 581 is performed by checking the above-mentioned status flag. When the status flag is on, a jump is made to GFC1.

Next, the start bit sampling 582 is checked. As mentioned above, the sampling period is 1/32 for the start bit, and 1/16 for the others. If the answer is "Yes" in this step, the sampling counter updating 583 updates by +2 to 1/32, while the sampling counter 584 updates by +1.

The sampling time over 585 is checked, and if the time is not yet over, the obstruction limit SW check 580 is returned to. The loop $L_2$ shown in the drawing is repeated until a sampling time over.

The number of processing steps of the loop $L_1$ in FIG. 31 is rendered the same as the number of processing steps of the loop $L_2$ of FIG. 32. If the answer at the sampling time over 585 is "Yes", the sampling error correction 586 is taken.

The number of processing steps at the $L_1$ loop is 32. Therefore, 32 processing steps per loop multiplied by 1/16 equals two processing steps per loop. Thus the value of the lower digits of the sync counter is counted as two processing steps for each count, thus correcting the error.

Next, the flow chart of FIG. 33 will be explained. The received data is collected into the carrier at 778. This carrier is included in the condition indication register 346 shown in FIG. 9. Next, it is determined at the frame No. 3 779 whether or not the frame No. 3 is involved, i.e., whether or not the frame stop bit FSP is involved. If it is involved, a jump is made to GFC3. If the answer is "No", on the other hand, the next step is taken to check the start bit 780. Whether or not it is a start bit is judged with reference to the bit count. If the bit count is zero, a jump is made to GFC4. If the bit count is not zero, by contrast, the next step is taken thereby to check the stop bit 781. Whether or not a stop bit is involved is determined from the bit count. If the bit count is 14, a jump is made to GFC5.

If it is not a stop bit, on the other hand, the DiPSW output $D_{01}$ and $D_{02}$ reset 782 and the DiPSW read output pattern load 783 are taken. This is followed by the checking of the frame No. 1 784. If the frame No. is not 1, the DiPSW output 0 to 3 output 785 is taken. Then the output pattern 786 is checked, and if it is zero, the DiPSW output $D_{01}$ output 787 is taken; while if the above-mentioned output pattern is zero, on the other hand, the DiPSW output $D_{01}$ reset 788 is taken. As will be seen from the output pattern, $R_{00}$ to $R_{03}$ are a 4-bit latch, while $D_{01}$ is a 1-bit latch. Because of this configuration, the above-mentioned method for setting the output pattern is used. This is also the case with the DiPSW output 4 to 7 output 789, the checking of the output pattern 790, the DiPSW output $D_{01}$ output 791 and the reset of the DiPSW output $D_{02}$ at 792 for frame No. 1.

Next, the flow chart of FIG. 34 will be explained. After it is determined that a stop bit input is involved by the checking of the stop bit 581 in FIG. 33, the stop bit normal 593 checks to see that the particular signal is a stop bit, i.e., "1". If a "0" input is involved, it is not a stop bit. This is not a normal condition and therefore subsequent sampling steps are not taken, but a jump is made to GFC1.

If the checking of the stop bit normal 593 shows that a normal stop bit is involved, the next step is taken. The checking of the received data 594, the obstruction limit SW check 595 and the obstruction limit SW input check 596 are repeated. In the meantime, after confirming at the received data 594 that the received data is "0", this loop is left and transferred to the next sampling counter initial value set 598. After that, a jump is made to GFC10. In this process, the level check is effected at the received data 594. In view of the fact that a new sampling is started from the fall point of the particular signal, the error up to that point of sampling is eliminated.

If the output pattern is not "0" as a result of the checking at the "output pattern=0" at 607, the processing in the same frame is being conducted, and the output pattern updating (double) 610 is taken.

The next step is the sampling counter initial value set 610, followed by the bit counter updating (+2) at 611. A jump is made to GFC9 shown in FIG. 32.

Figure 35:
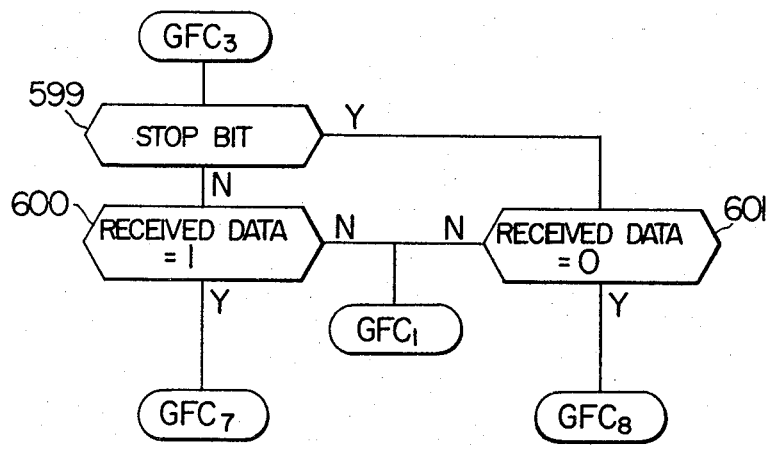

In FIG. 35, a jump is made to GFC8 is response to a data coincidence. This requires an average processing time of 80 msec in the receiving process flow chart (because one bit requires 2 msec and one frame 40 bits).

As a result, the receiving process 365 in FIG. 14 greatly affects the timer processing 368. To prevent this inconvenience, according to the embodiment under consideration, the 15.625 msec timer at the timer processing 368 is called five times at the timer counter correction 612. By approximate processing, the main timer is thus corrected.

Next, the start input discrete timer set 613 is taken, followed by the receiving process counter zero clear/receiving i/0 port reset 614.

Figure 33:
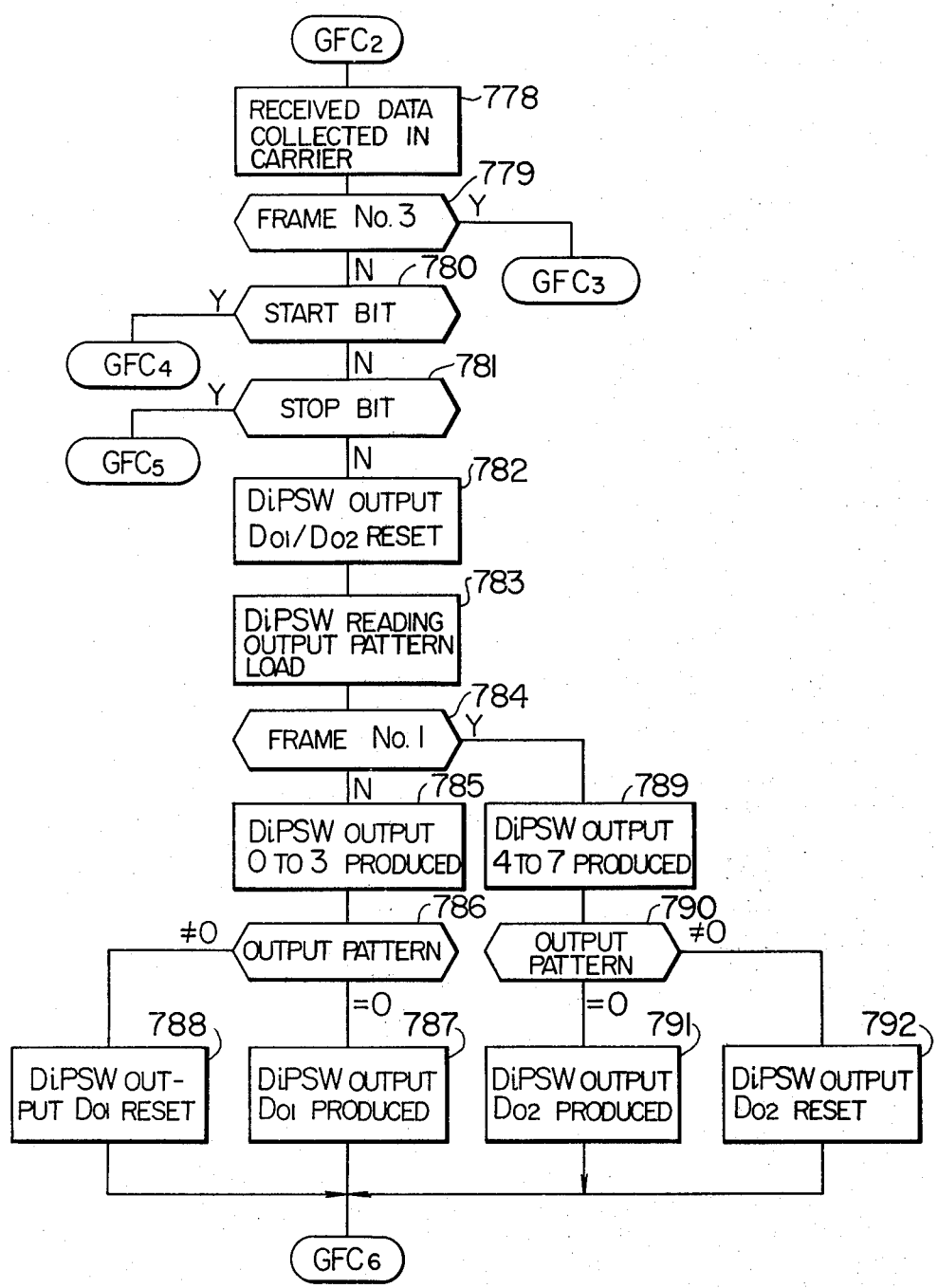
Figure 34:
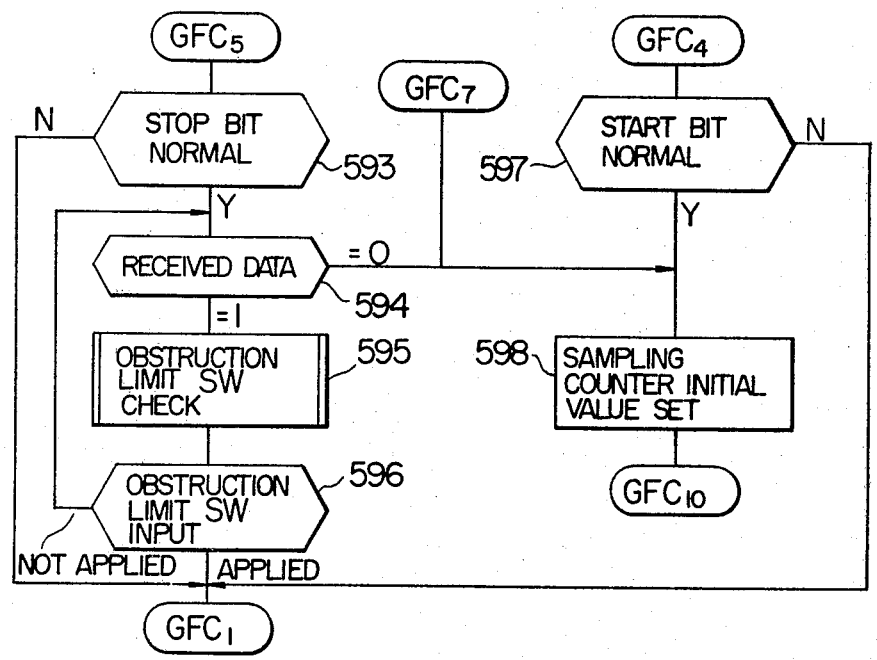

After it is decided that a start bit input is involved at the start bit 580 in FIG. 33, the start bit normal 597 checks to see that the particular signal is a start bit, i.e. "0". If it is a "1" signal, by contrast, it is not a start bit, and therefore a normal receiving condition is not involved, so that subsequent sampling processes are eliminated. Instead, a jump is made to GFC1.

If the checking at the start bit normal 597 shows a normal start bit, the next step, i.e., the sampling counter initial value set 598 is taken.

The process shown in FIG. 35 is made in the case where it is determined that the frame No. 3 is involved by the checking of the frame No. 3 579 in FIG. 33.

Whether or not a stop bit is involved is determined by a bit counter at the stop bit 599. If the bit count is 8, 10 or 12, the "received data=0" is taken at 600.

If the bit count is any one of the above-mentioned values, the received data must be "1", in which case a jump to GFC7 shows a normal condition. If the received data is "0", by contrast, the receiving condition is abnormal and a jump is made to GFC1.

Also, if the checking of the stop bit 599 shows that the count is 14, the "received data=0" 601 is checked. When the bit count is 14 as shown above, the received data is required to be "0", and the jump to GFC8 is normal. If the received data is "1", on the other hand, the receiving condition is abnormal and a jump is made to GFC1.

Figure 36:
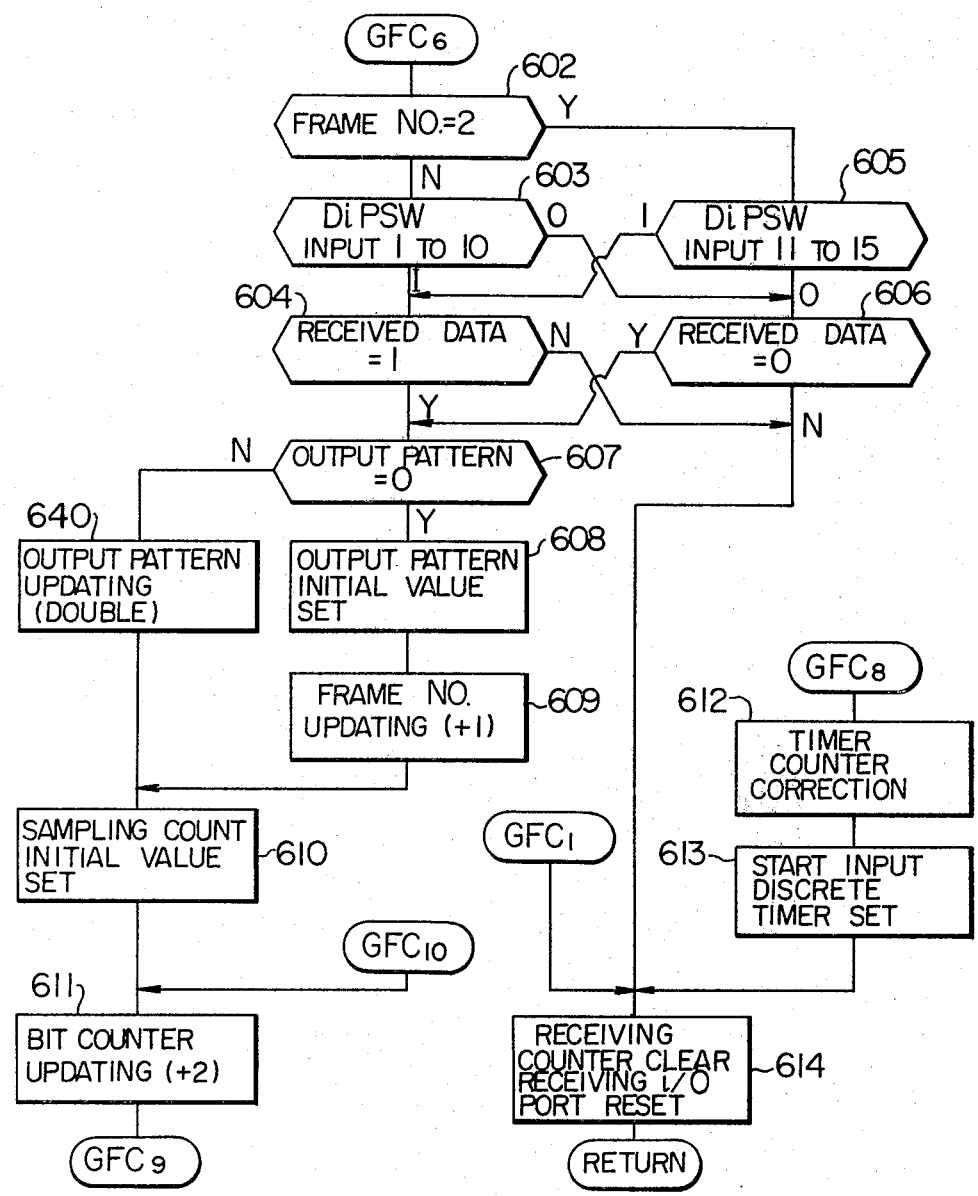

FIG. 36 shows a continuation of the processes from FIG. 33. By checking the "frame No.=2" at 602, the input port of the DiPSW set is discriminated. If frame No.=2 as shown in FIG. 30, the input port is $I_2$ corresponding to DiPSW inputs 11 to 15. Thus the DiPSW inputs 11 to 15 are checked at 605, and if it is "1", the "received data=1" at 604 is checked. If the signal is "0", by contrast, the "received data=0" at 606 is checked. If coincidence is attained as a result of checking, the "output pattern=0" at 607 is checked. In the case of failure to coincide, on the other hand, the receiving process counter zero clear/receiving process i/0 port reset 614 is taken.

If the frame No. is not 2 in this case, the input port is $I_1$ which corresponds to the DiPSW inputs 1 to 10.

Thus, the DiPSW inputs 1 to 10 are checked at 604, and if it is "0", the "received data=0" at 606 is checked. If coincidence is attained, the "output pattern=0" at 607 is checked. In the case of coincidence failure, by contrast, the receiving process counter zero clear/receiving process i/0 port reset 614 is taken.

The next step to be taken is the checking of the "output pattern=0" at 607. If the output pattern is "0", it means that the checking of the data 5 bits is completed, and it is necessary to set a new data collection pattern for the next frame.

For this purpose, the output pattern initial value set 608 is taken, and a "1" is set as an output pattern. Also, the frame No. updating (+1) 609 is taken. The next step to be taken is the sampling count initial value set 610, followed by the bit counter updating (+2) at 611. Then a jump is made to the position of GFC9 shown in FIG. 32. If the output pattern is not "0", it means that the checking of the data 5 bits is not completed, and it is necessary to check the next input data. For this purpose, the output pattern updating (double) at 640 is taken and the next step to be taken is the sampling count initial value set at 610, followed by the bit counter updating (+2) at 611. Then a jump is made to the position of CFC9 shown in FIG. 32.

The diagram of FIG. 37 shows the manner in which the obstruction limit SW is checked. First, the in-operation flag 615 is checked. Specifically, while the door is in operation, the obstruction SW 616 is checked. If the obstruction SW is on, the status flag set 620 is taken. In the case where the obstruction SW is off, on the other hand, the operating direction limit SW is checked at 617. If it is on, the status flat set 620 is taken. When it is off, on the other hand, the status reset 618 is taken.

In the event that the in-operation flag 615 is off, i.e., the door is stationary, coincidence with the number of steps required for operation is required. Otherwise, the timer must be changed in function between stoppage and operation of the door. Thus the step number coincidence 619 is taken.

An application of the present invention will be described below. According to the foregoing embodiment, for the purpose of time control, part of the temporary memory circuit is used as timing means for timing operation for each predetermined step. This construction is low in cost but not very high in timing accuracy. One method for improving the timing accuracy is to use means for counting the time alone. Specifically, a timing circuit is used which is started by the program memory circuit and in which a specific value is settable. Apart from this, a circuit for generating a timing pulse at predetermined intervals of time may be connected to the input-output circuit, so that each timing pulse input is processed prior to the program in execution.

By doing so, the timing is processed by counting the timing pulses or by use of an input signal of a specific length of timing. This method is generally called an interruption control.

In the aforementioned embodiment, an example of basic mode transfer of the door operating device includes a cycle of upward movement, stop, downward movement and stop. As another application of this invention, however, the example of basic mode transfer as described below may of course be utilized.

In response to each operating input signal, the operation and stop are repeated, and if the door operating device reaches the upper or lower limit position, it is stopped. In response to the next operating input signal, the operating direction is reversed, so that the door is moved in accordance with the command of the operating direction.

In other words, the upward movement and stop are repeated and also, the downward movement and stop are repeated.

In the aforementioned embodiment, the operating input signal is not able to directly designate the direction of door movement. An upward movement command switch and a downward movement command switch may be added to the additional circuit, whereby in response to an input signal to either switch, the door is moved in the direction designated by that switch. This is easily realized only by adding the above-mentioned process to the processing program.

Even according to the embodiment under consideration, it is possible to directly designate the direction of door movement. This is by inserting a switch in parallel to the lower limit switch and the upper limit switch in the circuit to which the outputs from the upper and lower limit switches are applied. In this case, if the upper limit switch is on, the downward movement command is issued, while if the lower limit switch is on, the upward movement command is issued, as easily understood.

In the above-described embodiment, the conditions change after detection of an obstruction in such a manner that the door moving up stops while the door moving down moves up for a predetermined length of time after stoppage for a predetermined period of time. According to the present invention, after detection of an obstruction, the process includes a control according to the condition of the door in operation. Specifically, the door is reversed in operation, or the stoppage thereof is eliminated for a predetermined length of time, or the door is moved up not for a predetermined length of time but up to the upper limit point, thus widening the freedom of the condition change processing control.

Another feature of the present invention is that after detection of an obstruction, the door is stopped if moving up, and is moved up for a predetermined length of time after stoppage for a predetermined length of time if moving down. If the door is moving down, the door may alternatively be immediately reversed in direction and moved up for a predetermined length of time. Furthermore, upon receipt of the next door operation command input, the door is moved up again. This operation may take the processes as mentioned below.

If an obstruction is encountered during door downward movement,
  (1) The door is moved up, and
    (1) Upon receipt of a door operation command, the door is stopped, and
    (2) Upon receipt of the next door operation command after door stoppage of (1) above, the door is moved up again; or
  (2) The door is moved up, and
    (1) Upon receipt of a door operation command, the first door operation command is ignored, and
    (2) Upon receipt of a second door operation command, the door is stopped.

In any case, the processes are different from those of the ordinary door operation pattern, thus further improving the door operating safety.

As another alternative method, during the process after detection of an obstruction, no new operating input signal is accepted, while only after completion of the above-mentioned process, a new operating input signal is accepted.

Still another alternative method is such that regardless of the process being conducted after detection of an obstruction, a new operating input may be accepted.

In the above-mentioned embodiment, the operation time of the door operating device is controlled in such a manner that unless a detection signal of the door operating device is not applied within the operating time, it is judged as abnormal. According to the present invention, due to this operation time control, it is sufficient to provide a condition different from the door in operation. Thus the processes as mentioned below may be taken.

1. The door operating device is stopped.
2. The door operating device is reversed.
3. If the door operating device is in opening operation, it is stopped; while if it is in closing operation, it is reversed to opening operation for a predetermined length of time.
4. If the door operating device is in opening operation, it is stopped; while if it is in closing operation, it is reversed to opening operation.

In the case 2, 3 or 4 above where the door operation is reversed in direction, it may be stopped for a certain period of time.

Still another conceivable method is such that a new operating input signal is not accepted before the above-mentioned process is completed. Notwithstanding, a new operating input signal may be accepted during the same process.

As described above, in the case where the next operation command signal is received while the door is stationary following the opening for a predetermined length of time in response to an obstruction detection signal or a maximum drive time over detection signal, the control device operates in a manner to open the door, thus further improving the door operating safety.

What is claimed is:

1. A door operation control apparatus comprising door drive means and control means for controlling said door drive means, said control means including an output control circuit for controlling said door drive means in such a manner as to effect selected one of the opening, stopping and closing of said door, condition detector means for detecting various conditions of selected one of the door and the door drive means, door operation command means, and a signal processing circuit for effecting logic decision on a signal from said condition detector means and said door operation command means thereby to control said output control circuit, said signal processing circuit stepping forward the repetitive operating cycle of door opening, stoppage, closing and stoppage in response to each command signal applied thereto from said operation command means, said signal processing circuit further controlling said output control circuit in such a manner as to open said door in response to an obstruction detection signal from said condition detector means indicative of the fact that the door closing operation has been prevented, said signal processing circuit including means for processing signals in such a manner as to open said door for a predetermined length of time in response to said obstruction detection signal and means for processing signals in such a manner as to control said output control circuit so that the door is opened again in response to a command signal from said door operation command means if the door is stationary after said opening operation by said obstruction detection signal.

2. A door operation control apparatus according to claim 1, wherein said signal processing circuit includes means for processing signals in the same manner as the stoppage after the door closing in said repetitive operating cycle of the opening, stoppage, closing and stoppage as a stoppage control after the opening operation by said obstruction detection signal.

3. A door operation control apparatus comprising door drive means and control means for controlling said door drive means, said control means including an output control circuit for controlling said door drive means in such a manner as to effect selected one of the opening, stopping and closing of said door, condition detector means for detecting various conditions of selected one of the door and the door drive means, door operation command means, and a signal processing circuit for effecting logic decision on a signal from said condition detector means and said door operation command means thereby to control said output control circuit, said signal processing circuit stepping forward the repetitive operating cycle of door opening, stoppage, closing and stoppage in response to each command signal applied thereto from said operation command means, said signal processing circuit further controlling said output control circuit in such a manner as to stop the closing of said door in response to a maximum drive time over detection signal from said condition detector means indicative of the fact that the door closing operation has continued for longer than a predetermined maximum drive time, said signal processing circuit including means for processing signals in such a manner as to stop the door closing operation and open said door for a predetermined length of time followed by the stoppage thereof in response to said maximum drive time over detection signal, and means for processing signals in such a manner as to control said output control circuit so that the door is opened again in response to a command signal from said door operation command means during the stoppage of the door following the opening thereof for said predetermined length of time.

4. A door operation control apparatus according to claim 3, wherein said signal processing circuit includes means for processing signals in the same manner as the stoppage after the closing operation in said repetitive operating cycle of opening, stoppage, closing and stoppage as a stoppage control after the opening operation in response to the maximum drive time over detection signal.

* * * * *